(12) United States Patent
Horigome et al.

(10) Patent No.: US 6,317,471 B1
(45) Date of Patent: Nov. 13, 2001

(54) INFORMATION REPRODUCING APPARATUS AND REPRODUCING METHOD

(75) Inventors: Junichi Horigome; Shigeo Yamaguchi, both of Kanagawa; Takayoshi Chiba, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/059,477

(22) Filed: Apr. 13, 1998

(30) Foreign Application Priority Data

Apr. 18, 1997 (JP) .................................................. 9-101689

(51) Int. Cl.[7] ...................................................... H03D 1/00
(52) U.S. Cl. ......................... 375/341; 375/262; 375/376; 714/795
(58) Field of Search ..................................... 375/262, 341, 375/376; 714/759, 794, 795, 798; 369/47, 59

(56) References Cited

U.S. PATENT DOCUMENTS

| | | | |
|---|---|---|---|
| 4,777,636 | 10/1988 | Yamashita et al. | 371/43 |
| 5,291,499 | 3/1994 | Behrens et al. | 371/43 |
| 5,311,523 | 5/1994 | Serizawa et al. | 371/43 |
| 5,341,386 | 8/1994 | Shimoda et al. | 371/43 |
| 5,689,488 | 11/1997 | Yamaguchi | 369/59 |
| 5,719,843 | * 2/1998 | Nakajima et al. | 369/59 |
| 5,946,329 | * 8/1999 | Hirose et al. | 714/795 |

OTHER PUBLICATIONS

U.S. Pat. application No. 09/057,796, filed Apr. 9, 1998.

* cited by examiner

*Primary Examiner*—Stephen Chin
*Assistant Examiner*—Chieh M. Fan
(74) *Attorney, Agent, or Firm*—Oblon, Spivak, McClelland, Maier & Neustadt, P.C.

(57) ABSTRACT

An ACS of a Viterbi decoder generates status data that an SMU represents a status transition corresponding to the maximum likelihood status transition selected corresponding to each read clock pulse. A merge block generates decoded data corresponding to status data. A timing generator generates timings of a leading edge and a trailing edge of a reproduced RF signal corresponding to status data. A PEC generates a phase error signal PE corresponding to a reproduced signal value sampled at these the timings (namely, sampling values of an A/D converter). With the phase error signal PE, a VCO is controlled. The memory length of the SMU that generates the timings is smaller than the memory length for a decoding process. One of the memory lengths can be selected depending on whether data is reproduced from a header area or a data area.

9 Claims, 23 Drawing Sheets

Fig. 4
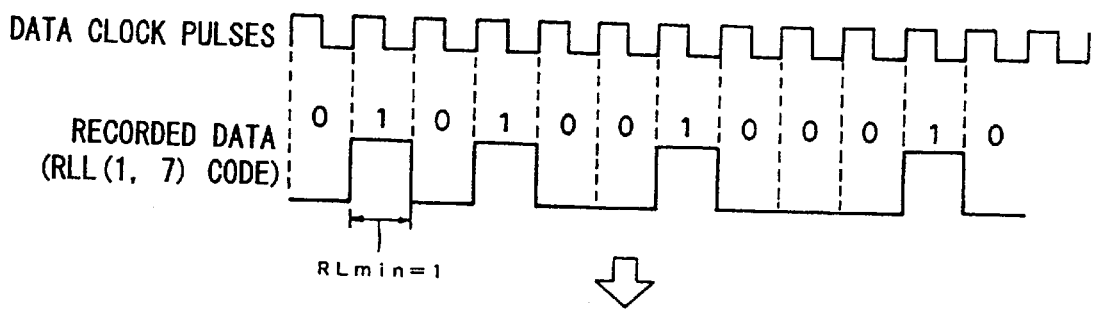
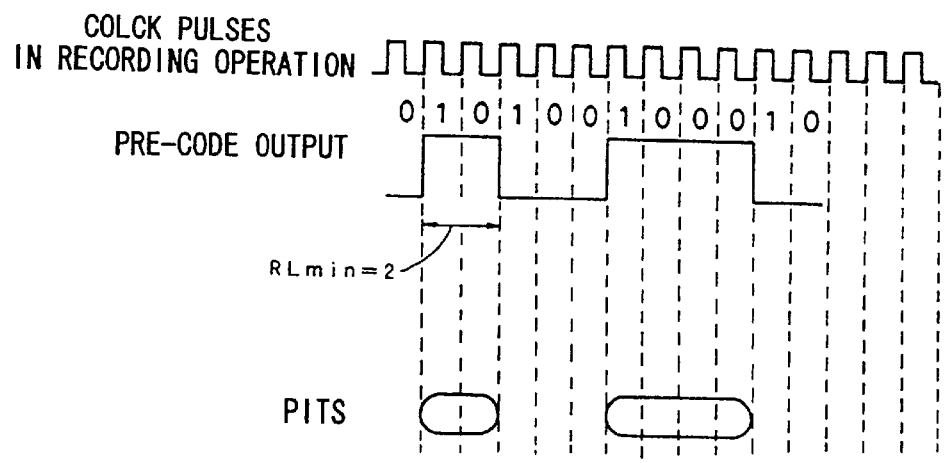

Fig. 9

| | |
|---|---|
| S3 ○ → ○<br>S2 ○ → ○ (crossing to S3) | $m(0, k-1)+z[k] < m(3, k-1)+\alpha * z[k]-\beta$<br>&& $m(2, k-1)-z[k] < m(1, k-1)-\alpha * z[k]-\beta$ |
| S1 ○ → ○<br>S0 ○ → ○ | $m(0, k) = m(0, k-1)+z[k]$<br>$m(1, k) = m(0, k-1)+\alpha * z[k]-\beta$<br>$m(2, k) = m(2, k-1)-z[k]$<br>$m(3, k) = m(2, k-1)-\alpha * z[k]-\beta$ |
| S3 ○ ○<br>S2 ○ ○ | $m(0, k-1)+z[k] \geqq m(3, k-1)+\alpha * z[k]-\beta$<br>&& $m(2, k-1)-z[k] < m(1, k-1)-\alpha * z[k]-\beta$ |
| S1 ○ ○<br>S0 ○ ○ | $m(0, k) = m(3, k-1)+\alpha * z[k]-\beta$<br>$m(1, k) = m(0, k-1)+\alpha * z[k]-\beta$<br>$m(2, k) = m(2, k-1)-z[k]$<br>$m(3, k) = m(2, k-1)-\alpha * z[k]-\beta$ |
| S3 ○ ○<br>S2 ○ ○ | $m(0, k-1)+z[k] < m(3, k-1)+\alpha * z[k]-\beta$<br>&& $m(2, k-1)-z[k] \geqq m(1, k-1)-\alpha * z[k]-\beta$ |
| S1 ○ ○<br>S0 ○ ○ | $m(0, k) = m(0, k-1)+z[k]$<br>$m(1, k) = m(0, k-1)+\alpha * z[k]-\beta$<br>$m(2, k) = m(1, k-1)-\alpha * z[k]-\beta$<br>$m(3, k) = m(2, k-1)-\alpha * z[k]-\beta$ |
| S3 ○ ○<br>S2 ○ ○ | $m(0, k-1)+z[k] \geqq m(3, k-1)+\alpha * z[k]-\beta$<br>&& $m(2, k-1)-z[k] \geqq m(1, k-1)-\alpha * z[k]-\beta$ |
| S1 ○ ○<br>S0 ○ ○ | $m(0, k) = m(3, k-1)+\alpha * z[k]-\beta$<br>$m(1, k) = m(0, k-1)+\alpha * z[k]-\beta$<br>$m(2, k) = m(1, k-1)-\alpha * z[k]-\beta$<br>$m(3, k) = m(2, k-1)-\alpha * z[k]-\beta$ |

Fig. 22

| MS | VM |
|---|---|
| 0 0 | VM00 |
| 0 1 | VM01 |
| 1 1 | VM11 |
| 1 0 | VM10 |

Fig. 23

| VMD | VM | DECODED DATA VALUE |
|---|---|---|
| 0 0 | 0 0 | 0 |
|  | 0 1 | 1 |
| 0 1 | 1 1 | 0 |
| 1 1 | 1 1 | 0 |
|  | 1 0 | 1 |
| 1 0 | 0 0 | 0 |

INFORMATION REPRODUCING APPARATUS AND REPRODUCING METHOD

BACKGROUND OF THE INVENTION

1. Field of the Invention

The present invention relates to an information reproducing apparatus applicable to a reproducing apparatus that performs a Viterbi decoding process and a reproducing method thereof, in particular, to a detection of a phase error of a PLL.

2. Description of the Related Art

In a digital signal reproducing apparatus, a PLL (Phase Locked Loop) is used to generate a clock signal that synchronizes with a reproduced digital signal. Conventionally, an edge of a reproduced signal is detected. With phase information of the edge, a phase error is detected. With the detected phase error, the frequency of a VCO (Voltage Controlled Oscillator) or a VFO (Variable Frequency Oscillator) is controlled. Thus, the PLL generates a clock signal that synchronizes with the reproduced signal.

However, when a reproduced signal includes noise of ½ T or larger, since the noise tends to fold back, the PLL may get disordered and thereby a malfunction such as a bit slip may take place.

OBJECTS AND SUMMARY OF THE INVENTION

Therefore, an object of the present invention is to provide an information reproducing apparatus that adequately controls the PLL corresponding to a phase error detected by Viterbi decoding process and a reproducing method thereof.

A first aspect of the present invention is an information reproducing apparatus for decoding a signal reproduced from a record medium corresponding to Viterbi decoding method, comprising a status data generating means for generating status data that represents the maximum likelihood status transition with a reproduced signal value sampled corresponding to a clock signal, a decoded data outputting means for outputting decoded data with the status data, a detection timing generating means for generating a detection timing of a phase error signal corresponding to a leading edge or a trailing edge of a reproduced signal with the status data, a phase error signal generating means for calculating the reproduced signal value at the detection timing so as to generate a phase error signal, and a PLL (Phase Locked Loop) for receiving the phase error signal as a control signal and generating the clock signal.

A second aspect of the present invention is an information reproducing method for decoding a signal reproduced from a record medium corresponding to Viterbi decoding method, comprising the steps of generating status data that represents the maximum likelihood status transition with a reproduced signal value sampled corresponding to a clock signal, generating decoded data with the status data, generating a detection timing of a phase error signal corresponding to a leading edge or a trailing edge of a reproduced signal with the status data, calculating the reproduced signal value at the detection timing so as to generate a phase error signal, and supplying the phase error signal as a control signal to a PLL (Phase Locked Loop) that generates the clock signal.

A third aspect of the present invention is an information reproducing apparatus for decoding a signal reproduced from a record medium corresponding to Viterbi decoding method, comprising a branch metric calculating means for calculating branch metrics for available statuses at particular time point with a reproduced signal that is input, a path metric updating means for selecting the maximum likelihood path metric in each status with added values of the branch metrics and preceding path metrics, outputting a first selection signal corresponding to the selected result, and outputting a second selection signal with the minimum value of the path metrics, a status data generating means, having a plurality of status memories corresponding to the individual statuses, for updating status data that represents each status with the first selection signal corresponding to a clock signal in each status memory, a status data selecting means for outputting the most adequate status data from the status data stored in the status memories with the second selection signal, a data decoding means for outputting decoded data with the selected status data and the preceding status data, a phase error signal generating means for detecting a phase error of the reproduced signal corresponding to the status data received from the status data generating means, and a clock signal generating means for generating the clock signal with the phase error signal.

The Viterbi decoder can generate status data that represents the maximum likelihood status transition to be selected. Corresponding to the status data, the detection timing of a phase error can be obtained. Corresponding to the detection timing of the phase error, a phase error can be detected.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 4 is a schematic diagram showing that the minimum magnetizing inversion width is 2 in RLL(1, 7) code encoding method;

FIG. 9 is a schematic diagram showing a condition of a status transition corresponding to a standardized metric in the four-value four-status Viterbi decoding method;

FIG. 22 is a table for explaining a status data value selecting operation of the merge block shown in FIG. 21;

FIG. 23 is a table that the merge block shown in FIG. 21 references for generating decoded data;

DETAILED DESCRIPTION OF THE PREFERRED EMBODIMENTS

For easy understanding of the present invention, as an example of a recording/reproducing apparatus having a reproducing system corresponding to Viterbi decoding method, the overall structure of the apparatus, the sector format of a record medium, an outline of a four-value four-status Viterbi decoding method, the structure and operation of a Viterbi decoder that accomplishes the four-value four-status Viterbi decoding method, and another Viterbi decoding method other than the four-value four-status Viterbi decoding method will be described one after the other.

[Outline of Disc Recording/Reproducing Apparatus]

Figure 1:
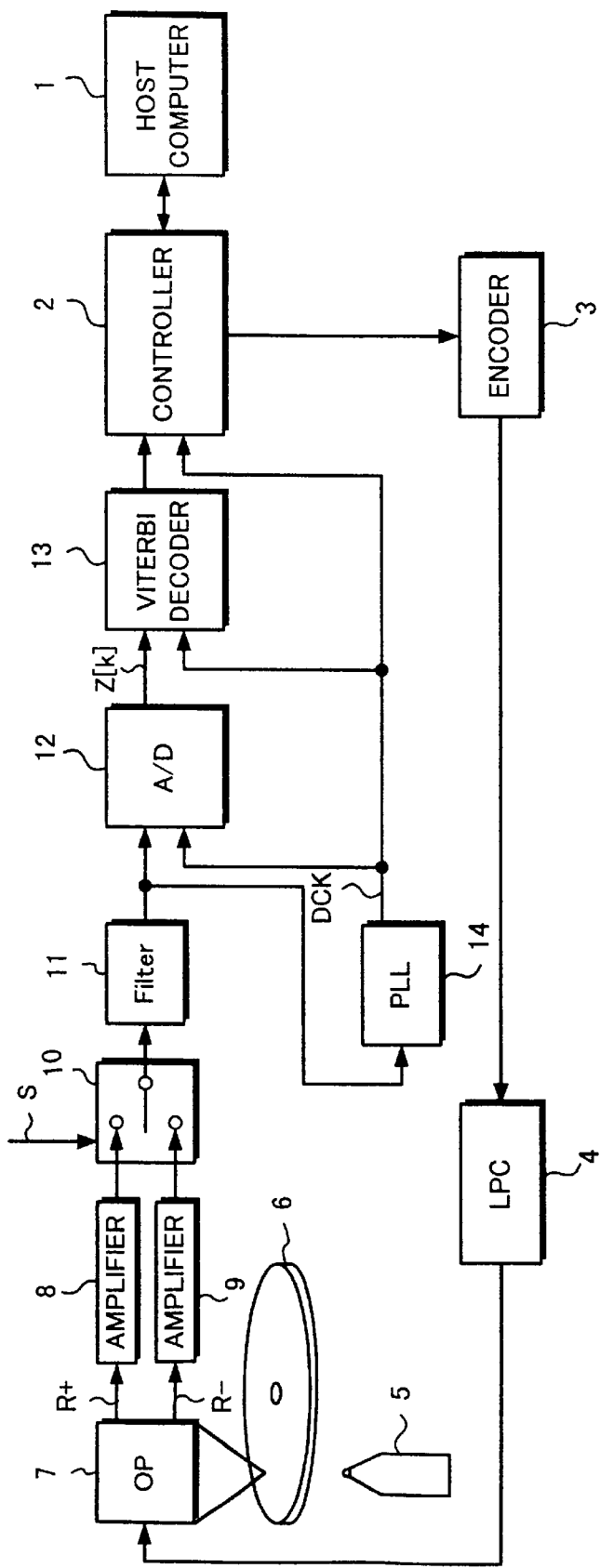
FIG. 1 is a block diagram showing the overall structure of an example of a magneto-optic disc apparatus according to the present invention.

Next, an example of a recording/reproducing apparatus having a reproducing system corresponding to the Viterbi decoding method will be described. FIG. 1 is a block diagram showing the overall structure of a magneto-optic disc apparatus having a reproducing system corresponding to the Viterbi decoding method. When a recording operation is performed, a controller 2 receives user data to be recorded corresponding to a command issued by a host computer 1 and encodes the user data as information words to RLL(1, 7) code as code words. The code words are supplied as record data to a laser power controlling portion (LPC) 4. In addition, the controller 2 performs a decoding process (that will be described later), controlling processes for a recording mode, a reproducing mode, and an erasing mode, and an communication operation with the host computer 1.

The LPC 4 controls a laser power of an optical pickup 7 corresponding to the supplied record data so as to form a pit sequence with magnetic polarities on a magneto-optic disc 6. When the data is recorded, a magnetic head 5 applies a bias magnetic field to the magneto-optic disc 6. Actually, the data is recorded in a mark edge recording method corresponding to a pre-code output (that will be described later) generated corresponding thereto.

As will be described later, a record position (namely, a pit position) is controlled by a particular means (not shown) that aligns the magnetic head 5 and the optical pickup 7. Thus, in the recording mode, when the optical pickup 7 passes an address portion, the similar operation is performed as with the reproducing mode.

Figure 2:
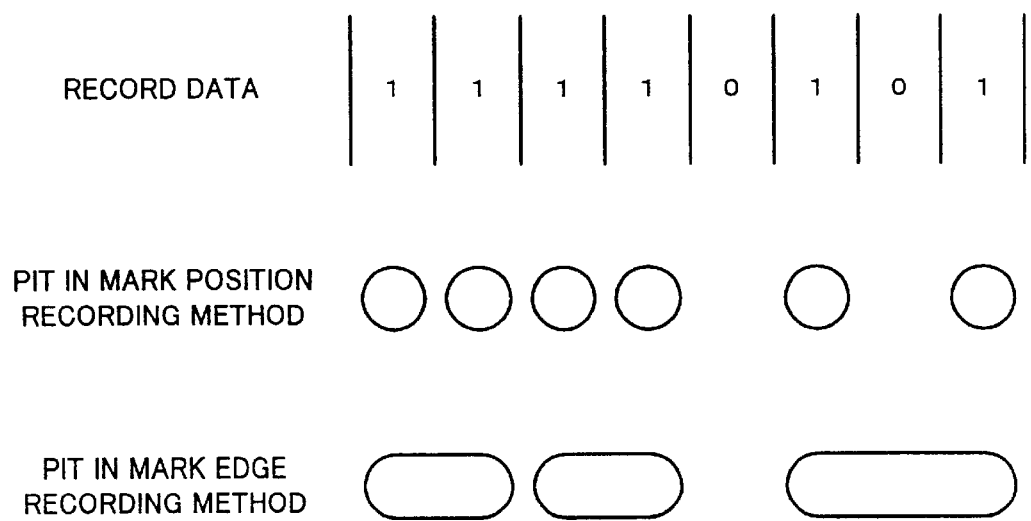
FIG. 2 is a schematic diagram for explaining a mark position recording method and a mark edge recording method.

Next, with reference to FIG. 2, a method for causing each pit formed in the above-described manner to correspond to each bit of a pre-code generated corresponding to record data will be described. A recording method of which "0" or "1" of a pre-code represents the presence or absence of a pit formed on a record medium is referred to as mark position recording method. On the other, a recording method of which the inversion of the polarity at the boundary of each bit of a pre-code represents "1" is referred to as mark edge recording method. When a signal is reproduced, the boundary of each bit of a reproduced signal is recognized corresponding to a read clock pulse DCK (that will be described later).

Next, the structure and operation of the reproducing system will be described. The optical pickup 7 radiates laser light to the magneto-optic disc 6, receives the reflected light thereof, and reproduces a signal corresponding to the reflected light. The reproduced signal is composed of four signals that are a sum signal $R_+$, a difference signal $R_-$, a focus error signal, and a tracking error signal (the focus error signal and the tracking error signals are not shown). The sum signal $R_+$ is supplied to an amplifier 8. The amplifier 8 adjusts for example the gain of the sum signal $R_+$. The resultant sum signal $R_+$ is supplied to a selection switch 10. On the other hand, the difference signal $R_-$ is supplied to an amplifier 9. The amplifier 9 for example adjusts the gain of the difference signal $R_-$. The resultant difference signal $R_-$ is supplied to the selection switch 10. The focus error signal is supplied to a means (not shown) that removes a focus error. The tracking error signal is supplied to a servo system (not shown).

A selection signal S (that will be described later) is supplied to the selection switch 10. The selection switch 10 supplies the sum signal $R_+$ or the difference signal $R_-$ to a filter portion 11 corresponding to the selection signal S. In other words, corresponding to a sector format of the magneto-optic disc 6, while a signal reproduced from an embossed portion is being supplied to the selection switch 10, the sum signal $R_+$ is supplied to the filter portion 11. While a signal reproduced from a magneto-optically recorded portion is being supplied to the selection switch 10, the difference signal $R_-$ is supplied to the filter portion 11.

The selection signal S is generated in the following manner. A signal that is reproduced from a predetermined pattern defined in a sector format is detected from the reproduced signal. An example of the predetermined pattern is a sector mark SM (that will be described later). When such a signal is detected, by counting the number of read clock pulses, the selection signal is generated.

The filter portion 11 is composed of a low pass filter that does not pass a noise component and a waveform equalizer that equalizes the waveform of a signal. As will be described later, the waveform equalizing characteristic in the waveform equalizing process corresponds to Viterbi decoding method of a Viterbi decoder 13. An A/D converter 12 that receives an output signal of the filter portion 11 samples a reproduced signal value z[k] corresponding to the read clock pulses DCK (that will be described later). The Viterbi decoder 13 generates decoded data with a reproduced signal value z[k] corresponding to the Viterbi decoding method. The decoded data is the maximum likelihood decoded data sequence of the recorded data. Thus, when there is no error in decoded data, the decoded data accords with the recorded data.

The decoded data is supplied to the controller 2. As described above, the recorded data is code words of which user data has been encoded by a channel-encoding process. Thus, when the error rate of decoded data is sufficiently low, the decoded data can be treated as recorded data as code words. The controller 2 performs the decoding process corresponding to the channel-encoding process for the decoded data and reproduces the user data and so forth.

Output data of the filter portion 11 is also supplied to a PLL portion 14. The PLL portion 14 generates the read clock pulses DCK corresponding to the signal received from the filter portion 11. The read clock pulses DCK are sent to the controller 2, the A/D converter 12, the A/D converter 12, and the Viterbi decoder 13 and so forth. The controller 2, the A/D converter 12, and the Viterbi decoder 13 operate corresponding to the read clock pulses DCK. In addition, the read clock pulses DCK are supplied to a timing generator (not shown). The timing generator generates a signal that controls the operation timing of the apparatus such as the switching operation between the recording operation and the reproducing operation.

In the above-described reproducing operation, the operations of the individual structural portions of the reproducing system are adapted so as to obtain correct reproduced data corresponding to the signal reproduced from the magneto-optic disc 6. Such an operation is referred to as calibration. The calibration is performed for adapting parameters of the reproducing system because the quality of a reproduced signal varies corresponding to the characteristics of a record medium (such as machining accuracy), the fluctuation of the power of recording laser light, and the recording/reproducing conditions (such as ambient temperature).

The calibration includes an adjustment of the power of reading laser light of the optical pickup 7, adjustments of the gains of the amplifiers 8 and 9, an adjustment of the waveform equalizing characteristics of the filter portion 11, and adjustments of amplitude reference values of the Viterbi decoder 13. The calibration is performed by a structure not shown in FIG. 1 just after the power of the apparatus is turned on or when a record medium is replaced with another one.

[Outline of Sector Format of Record Medium]

Figure 3A:
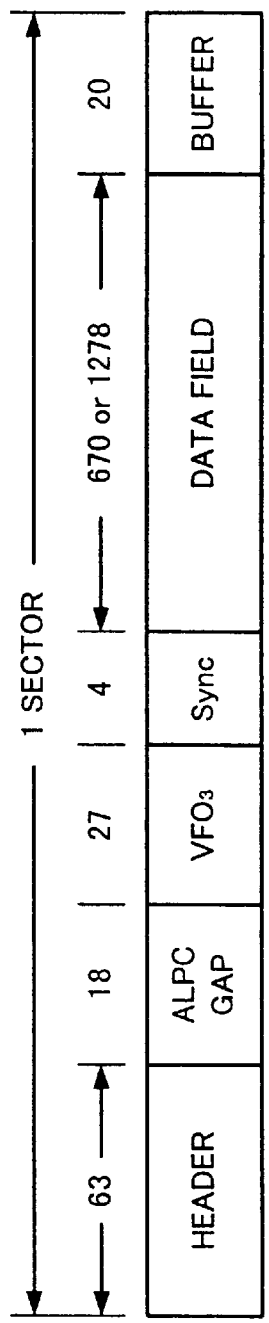
FIGS. 3A, 3B, and 3C are schematic diagrams for explaining an example of a sector format of a magneto-optic disc.

User data as sectors that are recording/reproducing data units are recorded on the magneto-optic disc 6. Next, with reference to FIG. 3, an example of the sector format of the magneto-optic disc 6 will be described. As shown in FIG. 3A, one sector has areas of a header, an ALPC, a gap, a $VFO_3$, a sync, a data field, and a buffer. In FIG. 3, numerals in individual areas represent bytes of data. Data that has been encoded by block encoding method is recorded on the magneto-optic disc 6. For example, data of eight bits is converted into data of 12 channel bits and recorded.

For example, there are two types of sector formats that are 1024-byte format and 512-byte format as the amount of user data. In the 1024-byte format, the number of bytes in the data field is 670 bytes. In the 512-byte format, the number of bytes in the data field is 1278 bytes. The pre-formatted header (63 bytes) and the ALPC and gap area (18 bytes) in the 1024-byte format are the same as those in the 512-byte format.

Figure 3B:
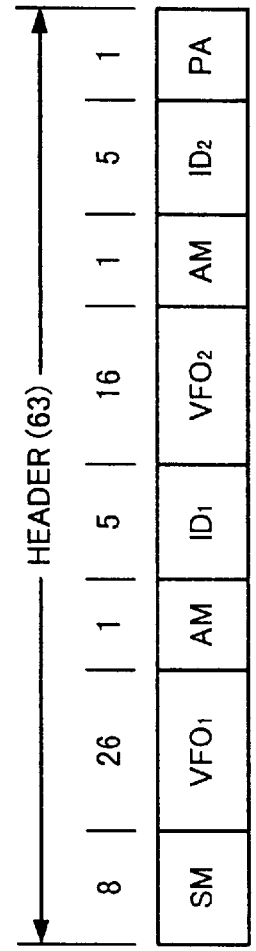

FIG. 3B shows the header composed of 63 bytes. The header has a sector mark SM (8 bytes), a $VFO_1$ (26 bytes) of a VFO field, an address mark AM (1 byte), an $ID_1$ (5 bytes) of an ID field, a $VFO_2$ (16 bytes) of the VFO field, an address mark AM (1 byte), an $ID_2$ (5 bytes) of the ID field, and a post-amble PA (1 byte).

Figure 3C:
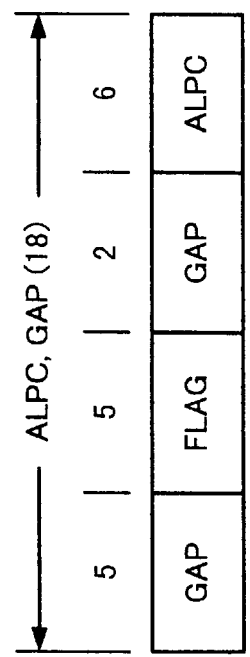

FIG. 3C shows the ALPC and gap area composed of 18 bytes. The ALPC and gap area has a gap field (5 bytes), a flag field (5 bytes), a gap field (2 bytes), and an ALPC (6 bytes).

Next, these fields will be described. The sector mark SM identifies the beginning of a sector. The sector mark SM has an embossed pattern that does not take place in the RLL(1, 7) code. The VFO field synchronizes with a VFO (Variable Frequency Oscillator) of the PLL portion 18. The VFO field is composed of the $VFO_1$, the $VFO_2$, and the $VFO_3$. $VFO_1$ and $VFO_3$ are embossed. The $VFO_3$ are magneto-optically written when the recording operation is performed for a relevant sector. The $VFO_1$, the $VFO_2$, and the $VFO_3$ have patterns of which channel bits "0" and "1" alternately take place. These patterns are referred to as 2T patterns. Thus, assuming that the time period of one channel bit is denoted by T, when the VFO field is reproduced, a signal of which the level is inverted at intervals of 2T is obtained.

The address mark AM is used to synchronize with the next ID field for each byte. The address mark AM has an embossed pattern that does not take place in the RLL(1, 7) code. The ID field has the address of a relevant sector (namely, information of a track number and a sector number) and a CRC byte for detecting an error thereof. The ID field is composed of five bytes. With the $ID_1$ and $ID_2$, the same address information is redundantly recorded. The post amble PA has a pattern of which channel bits "0" and "1" alternately take place (namely, a 2T pattern). The $ID_1$, $ID_2$, and the post amble PA are embossed. Thus, the header area is a pre-formed area of which pits have been embossed.

FIG. 3C shows the gap area. In the gap area, pits are not formed. The first gap field (5 bytes) is a field just preceded by the pre-formatted header. The first gap field is used to assure the time period that the apparatus requires to process the header. The second gap field (2 bytes) is used to absorb the deviation of the position of the $VFO_3$.

In the ALPC and gap area, a flag field of five bytes is recorded. When data of a relevant sector is recorded, 2T patterns are successively recorded in the flag field. The ALPC (Auto Laser Power Control) field is disposed to test the laser power in the recording mode. A sync field (4 bytes) is used to cause the apparatus to synchronize with the next data field for each byte.

The data field is used to record user data. The data field of 670 bytes has user data (512 bytes), an error detection/correction parity (144 bytes), a sector write flag (12 bytes), and two bytes (FF). On the other hand, the data field of 1278 bytes has user data (1024 bytes), an error detection/correction parity (242 bytes), and a sector write flag (12 bytes). The buffer field at the last of the sector is used as a tolerance for an electric/mechanical error.

In the above-described sector formats, the header is an area of which pits are embossed. The ALPC and the gap area are not used in the reproducing operation. The $VFO_3$, the sync field, and the data field are data areas that have been magneto-optically recorded.

[Outline of Four-value Four-status Viterbi Decoding Method]

Next, the Viterbi decoding method of the Viterbi decoder 13 will be described. As described above, user data is converted into code words as recorded data by various encoding methods. A proper encoding method is used corresponding to the characteristic of a record medium and a recording/reproducing method. In the magneto-optic disc apparatus, in a block encoding process, RLL (Run Length Limited) encoding method that limits the run length (namely, the number of "0"s between "1" and "1") has been widely used. There are several RLL encoding methods. Generally, m/n block code of which the number of "0"s between "1" and "1" is at least d and at most k is referred to as RLL(d, k; m, n) code.

For example, with the ⅔ block code, the block encoding method of which the number of "0"s between "1" and "1" is at least one and at most seven is RLL(1, 7; 2, 3) code. Generally, the RLL(1, 7; 2, 3) code is sometimes referred as to RLL(1, 7) code. Thus, in the following description, RLL(1, 7) code represents RLL(1, 7; 2, 3) code.

To decode a signal reproduced from data that has been recorded by a combination of the RLL encoding method and the mark edge recording method, the Viterbi decoding method can be used.

The RLL encoding method satisfies the conditions required for the encoding method from two view points of the improvement of the record density and the stability of the reproducing operation. As described above, in the mark edge recording method, since "1" of a pre-code generated with recorded data corresponds to the inversion of the polarity represented by an edge of each pit, as the number of "0"s between "1" and "1" is large, the number of bits recorded in each pit can be increased. Thus, the record density can be increased.

On the other hand, the read clock pulses DCK that cause the operations of the structural portions of the reproducing system to match are generated by the PLL portion 14 corresponding to a reproduced signal. Thus, as the number of "0"s between "1" and "1" is large, in the reproducing operation, the PLL portion unstably operates. Thus, the entire reproducing operation becomes unstable.

Considering such two conditions, the number of "0"s between "1" and "1" should be in a proper range. For the number of "0"s in recorded data, the RLL encoding method is effective.

As shown in FIG. 4, in the combination of the RLL(1, 7) encoding method and the mark edge recording method, at least one "0" is present between "1" and "1" of a pre-code generated corresponding to record data. Thus, the minimum inversion width is 2. When the encoding method whose minimum inversion width is 2 is used, as a method for reproducing recorded data from a reproduced signal that have been affected by inter-code interference and noise, four-value four-status Viterbi decoding method (that will be described later) can be used.

As described above, the filter portion 11 performs the waveform equalizing process for a reproduced signal. In the waveform equalizing process performed on the preceding stage of the Viterbi decoding process, partial response process that actively uses inter-code interference is used. The waveform equalizing characteristic is obtained in consideration of the linear record density of the recording/reproducing system and the MTF (Modulation Transfer Function) of the partial response characteristics expressed by $(1+D)^n$. The waveform equalizing process using PR(1, 2, 1) code for data recorded in the combination of the RLL(1, 7) encoding method and the mark edge recording method is disposed on the preceding stage of the four-value four-status Viterbi decoding method.

On the other hand, in the mark edge recording method, before data is recorded on a magneto-optic disc medium or the like, a pre-code is generated corresponding to the recorded data encoded by the RLL encoding process or the like. Assuming that the record data sequence at each time point k is denoted by a[k] and a pre-code thereof is denoted by b[k], the pre-code is generated as follows.

$$b[k]=\mathrm{mod}2\{a[k]+b[k-1]\} \qquad (1)$$

The pre-code b[k] is actually recorded on a magneto-optic disc medium or the like. Next, the waveform equalizing process with a waveform equalizing characteristic PR(1, 2, 1) performed by the waveform equalizer of the filter portion 11 will be described. However, in the following description, it is assumed that the amplitude of a signal is not standardized and that the waveform equalizing characteristic is denoted by PR(B, 2A, B). In addition, the value of a reproduced signal that does not consider noise is denoted by c[k]. A really reproduced signal that includes noise (namely, a signal reproduced from a record medium) is denoted by z[k].

With the waveform equalizing characteristic PR(B, 2A, B), the contribution of the amplitude at a time point k is 2A times as large as the value of the reproduced signal at the time point k. In addition, the contribution of the amplitude at the time point k−1 or k+1 is B times as large as the value of the reproduced signal at the time point k−1 or k+1. Thus, with the maximum value of the value of the reproduced signal, pulses are detected at time points k−1, k, and k+1. In this case, the maximum value of the reproduced signal is expressed as follows.

$$B+2A+B=2A+2B$$

The minimum value of the reproduced signal is 0. However, actually, as c[k], A+B of DC component is subtracted as follows.

$$c[k]=B\times b[k-2]+2A\times b[k-1]+B\times b[k]-A-B \qquad (2)$$

Figure 5:
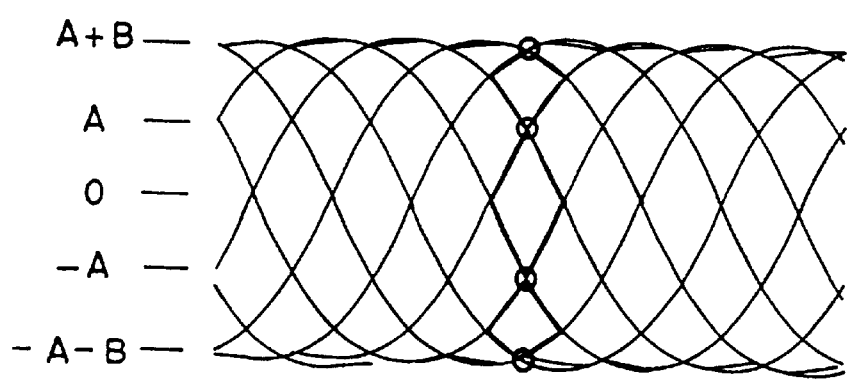
FIG. 5 is a schematic diagram for explaining an eye pattern in the case that a signal reproduced from data that has been recorded in a combination of RLL(1, 7) code encoding method and mark edge recording method is waveform-equalized with partial response characteristic PR(1, 2, 1)

Thus, the reproduced signal c[k] that does not consider noise is one of A+B, A, −A, or −A−B. Generally, as one of methods that represent the characteristic of a reproduced signal, reproduced signals at for example five time points are superimposed. The resultant signal is referred to as eye pattern. FIG. 5 shows an example of an eye pattern of a reproduced signal z[k] of which the magneto-optic disc apparatus according to the present invention has performed the waveform equalizing process with the waveform equalizing characteristic PR(BF 2A, B). FIG. 5 shows that the value of the reproduced signal z[k] at each time point deviates due to noise. However, from FIG. 5 it is clear that the value is one of A+B, A, −A, and −A−B. As will be described later, A+B, A, −A, and −A−B can be used as identification points.

Figure 7:
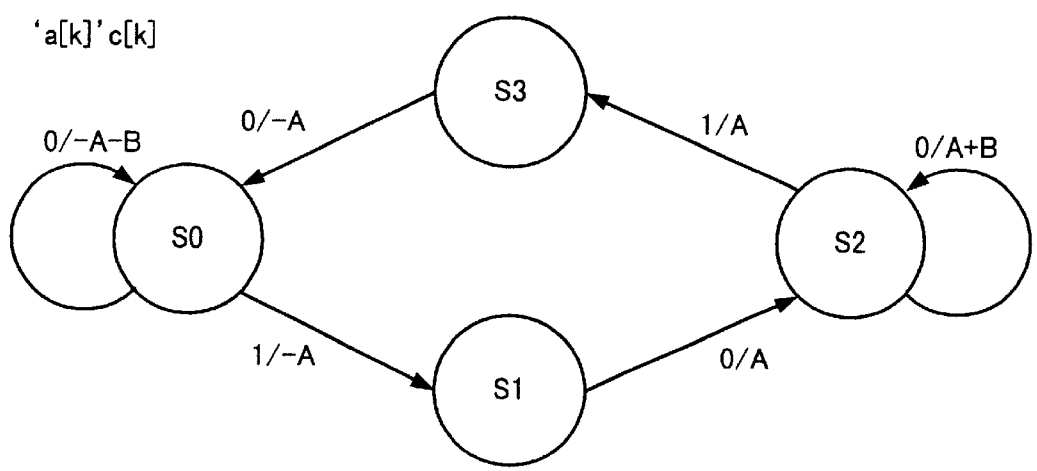
FIG. 7 is a schematic diagram showing an example of a status transition diagram of the four-value four-status Viterbi decoding method.

Next, the Viterbi decoding method for decoding a reproduced signal of which the above-described waveform equalizing process has been performed will be described. At step (1), all possible statuses corresponding to the encoding method and the record medium are obtained. At step (2), starting from each status at a particular time point, all possible status transitions at the next time point, record data a[k] of each status transition, and the value c[k] of the reproduced signal are obtained. A diagram that represents all the statuses and status transitions obtained at steps (1) and (2) and [value a[k] of record data/value c[k] of reproduced signal] in each status transition is referred to as status transition diagram. FIG. 7 shows a status transition diagram in the four-value four-status Viterbi decoding method. The Viterbi decoder 13 is structured so that it performs the decoding operation corresponding to the status transition diagram.

At step (3), based on the status transition diagram, the maximum likelihood status transition corresponding to the signal z[k] reproduced at each time point k from the record medium is selected. However, as described above, the signal z[k] has been waveform-equalized on the preceding stage of the Viterbi decoder 13. Whenever the maximum likelihood status transition is selected, the value of the recorded data a[k] in the status transition diagram is treated as a decoded value. Thus, decoded data a'[k] as the maximum likelihood decoded value sequence to the recorded data can be obtained. However, the maximum likelihood decoded value sequence is obtained from the decoded data value at each time point k is obtained by a PMU 23 of the Viterbi decoder 13. Thus, as described above, when there is no error in decoded data, the decoded data sequence a'[k] matches the recorded data sequence a[k]. Next, step (1) to (3) will be described in detail.

At step (1), a status at a time point k is defined with pre-codes at the time point k and earlier time points as follows. In other words, the status of which n=b[k], m=b[k−1], and 1=b[k−2] is defined as Snml. In this definition, it is considered that there are $2^3$=8 statuses. As described above, statuses that actually take place are restricted by the encoding method and so forth. In the recorded data sequence a[k] encoded with RLL(1, 7) code, since there is at least one "0" between "1" and "1", two or more "1"s do not succeed. A particular condition is applied to a pre-code b[k] corresponding to the conditions of the recorded data sequence a[k]. Thus, the resultant statuses are restricted.

Next, such a restriction will be practically described. As was described, a recorded data sequence that has been encoded with RLL(1, 7) does not include two or more "1"s that succeed. In other words, the following values do not take place.

$$a[k]=1, a[k-1]=1, a[k-2]=1 \quad (3)$$

$$a[k]=1, a[k-1]=1, a[k-2]=0 \quad (4)$$

$$a[k]=0, a[k-1]=1, a[k-2]=1 \quad (5)$$

Corresponding to such a condition for the recorded data sequence, as a condition for b[k] corresponding to Formula (1), it is clear that two statuses S010 and S101 do not take place. Thus, the number of possible statuses is $2^3-2=6$.

Next, at step (2), starting from a status at a particular time point j, to obtain statuses at the next time point j+1, the cases of which the value a[j+1] of recorded data at the time point j+1 is 1 and 0 should be considered.

In this example, the status S000 is considered. Corresponding to Formula (1), there are two recorded data values pre-coded as the status S000 (namely, n=b[j]=0, 1=b[j−1]=0, m=b[j−2]=0) as follows.

$$a[j]=0, a[j-1]=0, a[j-2]=1 \quad (6)$$

$$a[j]=0, a[j-1]=0, a[j-2]=0 \quad (7)$$

[when a[j+1]=1]

At this point, corresponding to Formula (1), b[j+1] is calculated as follows.

$$b[j+1] = \mod 2\{a[j+1]+b[j]\} \quad (8)$$
$$= \mod 2\{1+0\}$$
$$= 1$$

Thus, the value of the reproduced signal c[j] is calculated corresponding to Formula (2) as follows.

$$c[j+1] = \{B \times b[j+1] + 2A \times b[j] + B \times b[j-1]\} \quad (9)$$
$$= -A - B$$
$$= \{B \times 1 + 2A \times 0 + B \times 0\} - A - B$$
$$= -A$$

In addition, in the status Snlm at the next time point j+1, the conditions of n=b[j+1], 1=b[j], and m=b[j−1] are satisfied. As described above, since b[j+1]=1, b[j]=0, and b[j−1]=0, the status at the next time point j+1 is S100. Thus, when a[j+1]=1, a transition S000→S100 takes place.

[when a[j+1]=0]

At this point, corresponding to Formula (1), b[j+1] is calculated as follows.

$$b[j+1] = \mod 2\{a[j+1]+b[j]\} \quad (10)$$
$$= \mod 2\{0+0\}$$
$$= 0$$

Thus, the value of the reproduced signal c[j+1] is calculated corresponding to Formula (2) as follows.

$$c[j+1] = \{B \times b[j+1] + 2A \times b[j] + B \times b[j-1]\} - A - B \quad (11)$$
$$= \{B \times 0 + 2A \times 0 + B \times 0\} - A - B$$
$$= -A - B$$

In the status Snlm at the next time point j+1, the conditions of n=b[j+1], 1=b[j], and m=b[j−1] are satisfied. As described above, since conditions of b[j+1]=0, b[j]=0, and b[j−1]=0 are satisfied, the status at the next time point is S000. Thus, when a[j+1]=0, a transition S000→S000 takes place.

Thus, in each status other than S000 at the time point j, the relation between status transitions starting from the status S000 at the next time point j+1 and recorded data values a[j+1] and reproduced signal values c[j+1] in each of the status transitions can be obtained.

Figure 6:
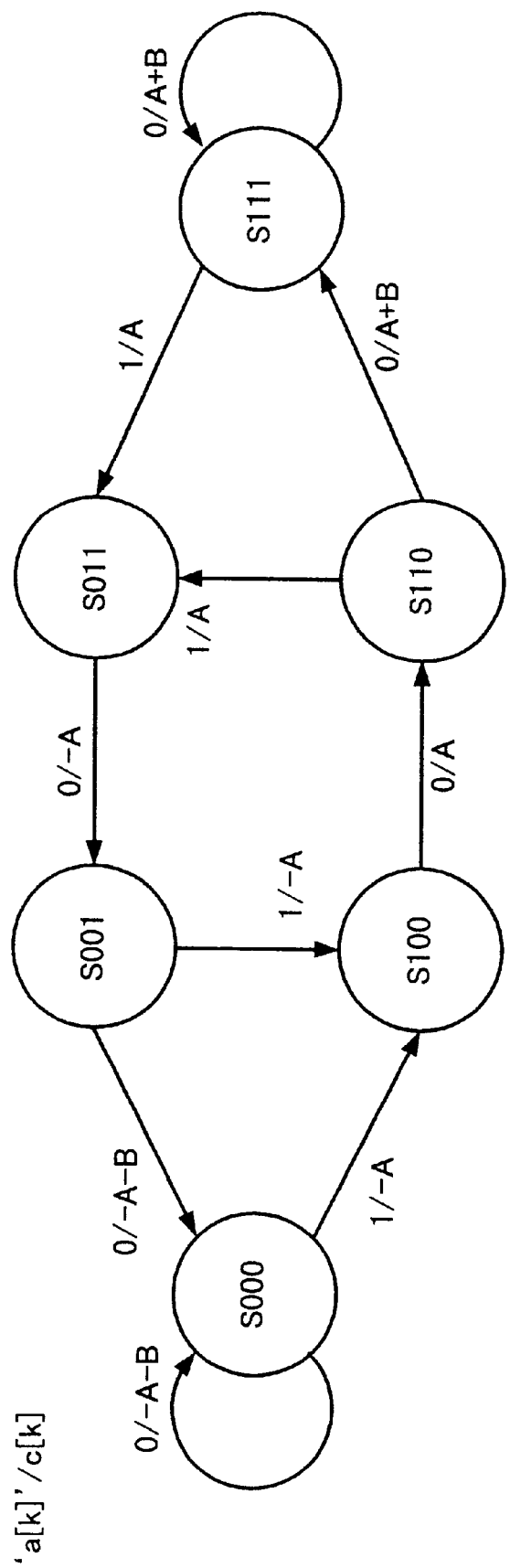
FIG. 6 is a schematic diagram for explaining a process for creating a status transition diagram of the four-value four-status Viterbi decoding method.

The relation between status transitions starting from each status and recorded data values and reproduced signal values in each of the status transitions is represented by a diagram shown in FIG. 6. The time points j and j+1 are not special time points. Thus, the relation between status transitions and recorded data values and reproduced signal values can be applied at any time point. Thus, in FIG. 6, a recorded data value and a reproduced signal value in a status transition at any time point k are denoted by a[k] and c[k], respectively.

In FIG. 6, a status transition is represented by an arrow. A code in association with each arrow represents [recorded data value a[k]/reproduced signal value c[k]]. There are two status transitions starting from each of the statuses S000, S001, S111, and S110. On the other hand, there is one status transition starting from each of the statuses S011 and In FIG. 6, in the statuses S000 and S001, when the recorded data value a[k] is 1, the reproduced signal value c[k] is −A. In this case, each of the statuses S000 and S001 changes to S100. When the recorded data value a[k] is 0, the reproduced signal value c[k] is −A−B. In this case, each of the statuses S000 and S001 changes to S000. In the statuses S111 and S110, when the recorded data value is a[k+1], the reproduced signal value is c[k+1]. In this case, each of the statuses S111 and S110 changes to the same status. Thus, the statuses S000 and S001 are denoted by S0. The statuses S111 and S110 are denoted by S2. In FIG. 7, the statuses S011 and S100 are denoted by S3 and S1, respectively.

As described above, FIG. 7 is a status transition diagram of four-value four-status Viterbi decoding method. FIG. 7 shows four statuses S0 to S4 and four reproduced signal values c[k+1]=−A−B, −A, A, and A+B. There are two status transitions starting from each of the statuses S0 and S2. There is only one status transition starting from each of the statuses S1 and S3.

Figure 8:
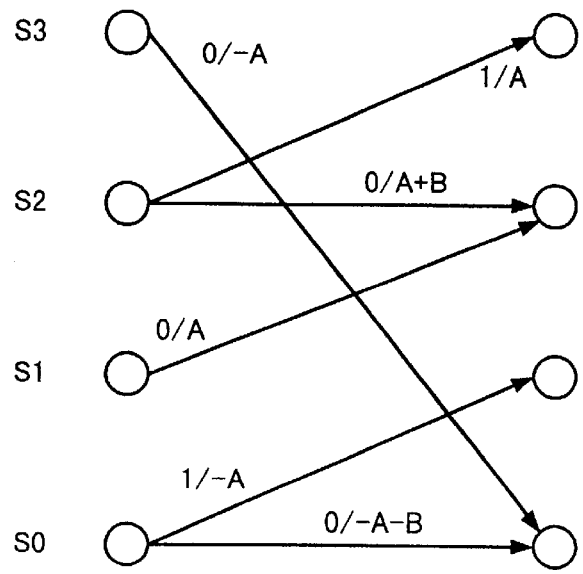
FIG. 8 is a schematic diagram showing an example of a Trellis diagram in the four-value four-status Viterbi decoding method.

As a format for chronologically representing status transitions, a trellis diagram as shown in FIG. 8 is used. In FIG. 8, status transitions between two time points are shown. However, it should be noted that transitions among many time points can be represented. In a trellis diagram, as time elapses, statuses changes rightwardly. Thus, a horizontal arrow represents a status transition of the same status (for example, from S0 to S0). On the other hand, a diagonal arrow represents a status transition of different statuses (for example, from S1 to S2).

Next, step (3) of the Viterbi decoding method (namely, based on the status transition diagram shown in FIG. 7, a method for selecting the maximum likelihood status transition from a really reproduced signal z[k] that includes noise) will be described.

To select the maximum likelihood status transition, with respect to a status at a particular time point k, the sums of likelihood of status transitions at a plurality of time points through other statuses are calculated. The sums are compared and the maximum likelihood decoded data sequence is selected. A sum of likelihood of status transitions is referred to as path metric.

To calculate a path metric, it is necessary to calculate the likelihood of a status transition between two adjacent time points. This calculation is performed with the value of the reproduced signal z[k] corresponding to the above-described status transition diagram in the following manner. Now, consider a status Sa at a time point k−1. When a reproduced signal z[k] is input to the Veterbi decoder 31, the likelihood of a stats transition to the status Sb is calculated as follows. In this case, statuses Sa and Sb are selected from four statuses in the status transition diagram shown in FIG. 7.

$$(z[k]-c(Sa, Sb))^2 \tag{12}$$

In Formula (12), c(Sa, Sb) is the value of a reproduced signal in a status transition from the status Sa to the status Sb in the status transition diagram shown in FIG. 7. In other words, in FIG. 7, in the status transition S0−S1, c(Sa, Sb) is −A. Thus, Formula (12) represents an Euclidean distance between the value of the really reproduced signal z[k] that includes noise and the value of the reproduced signal c(Sa, Sb) calculated without considering noise. A path metric at a particular time point is defined as the sum of likelihood of status transitions between adjacent time points.

Now, consider a status Sa at a time point k. In this case, when the status that changes to a status Sa at a time point k−1 is Sp, a path metric L(Sa, k) is calculated with a path metric at a time point k−1 as follows.

$$L(Sa, k)=L(Sp, k-1)+(z[k]-c(Sp, Sa)^2 \tag{13}$$

In other words, by adding a path metric L(Sp, k−1) in the status Sp at the time point k−1 and the likelihood (z[k]×c(Sp, Sa))² of the status transition Sp→Sa between the time point k−1 and the time point k, a path metric L(Sa, k) is calculated. The likelihood of the latest status transition as in (z[k]−c(Sp, Sa))² is referred to as branch metric. It should be noted that the branch metric is different from a branch metric calculated by a branch metric calculating circuit (BMC) 20 of the Viterbi decoder 13 (namely, a branch metric corresponding to a standardized metric).

When the status at a time point k is Sa, there may be a plurality of statuses that change to the status Sa at a time point k−1 (as in the status S0 and S2 shown in FIG. 7). When the status at the time point k is S0, the statuses that change to the status S0 at the time point k−1 are two statuses S0 and S3. When the status at the time point k is S2, there are two statuses S1 and S2 that change to the status S2 at the time point k−1. For general description, when the status at the time point k is Sa and the statuses that change to the status Sa at the time point k−1 are two statuses Sp and Sq, the path metric L(Sa, k) is calculated as follows.

$$L(Sa, k)=\min\{L(Sp, k-1)+(z[k]-c(Sp, Sa))^2, L(Sq, k-1)+(z[k]-c(Sq, Sa))^2\} \tag{14}$$

In other words, with respect to each of the case that the status at the time point k−1 is Sp and the status Sp changes to the status Sa by a status transition Sp→Sa and the case that the status at the time point k−1 is Sq and the status Sq changes to the status Sa by a status transition Sq→Sa, the sum of likelihood is calculated. The sums are compared. The smaller value of the sums is defined as a path metric L(Sa, k) for the status Sa at the time point k.

When the calculation for such a path metric is applied to the above-described four values and four statuses shown in FIG. 7, path metrics L(0, k), L(1, k), L(2, k), and L(3, k) of the statuses S0, S1, S2, and S3 at the time point k can be calculated with path metrics L(0, k−1), L(1, k−1), L(2, k−1), and L(3, k−1) in the statuses S0, S1, S2, and S3 at the time point k−1, respectively, as follows.

$$L(0, k)=\min\{L(0, k-1)+(z[k]+A+B)^2, L(3, k-1)+(z[k]+A)^2\} \tag{15}$$

$$L(1, k)=L(0, k-1)+(z[k]+A)^2 \tag{16}$$

$$L(2, k)=\min\{L(2, k-1)+(z[k]-A-B)^2 L(1, k-1)+(z[k]-A)^2\} \tag{17}$$

$$L(3, k)=L(2, k-1)+(z[k]-A)^2 \tag{18}$$

As described above, by comparing the values of the calculated path metrics, the maximum likelihood status transition is selected. To selet the maximum likelihood status transition, it is not necessary to calculate the values of the path metrics. Instead, the values of the path metrics are compared. Thus, in the real four-value four-status Viterbi decoding method, when standardized path metrics that are defined as follows are used instead of path metrics, calculations with respect to z[k] at each time point k can be easily performed.

$$m(i, k)=[L(i, k)-z[k]^2(A+B)^2]/2/(A+B) \tag{19}$$

When Formula (19) is applied to each of the statuses S0 to S3, standardized path metrics do not include square terms. Thus, the calculations of an adding, comparing, and selecting circuit (ACS) 21 can be simplified.

$$m(0, k)=\min\{m(0, k-1)+z[k], m(3, k-1)+\alpha \times z[k]-\beta\} \tag{20}$$

$$m(1, k)=m(0, k-1)+\alpha \times z[k]-\beta \quad (21)$$

$$m(2, k)=\min\{m(2, k-1)-z[k], m(1, k-1)-\alpha \times z[k]-\} \quad (22)$$

$$m(3, k)=m(2, k-1)+\alpha \times z[k]-\beta \quad (23)$$

where $\alpha$ and $\beta$ of Formulas (20) to (23) are defined as follows.

$$\alpha=A/(A+B) \quad (24)$$

$$\beta=B \times (B+2 \times A)/2/(A+B) \quad (25)$$

FIG. 9 shows conditions of status transitions of the four-value four-status Viterbi decoding method corresponding to such standardized path metrics. There are two formulas for selecting one from two in the above-described four standardized path metrics. Thus, there are (2×2=4) conditions.

[Outline of Four-value Four-status Viterbi Decoder]

Next, with reference to FIG. 10, the Vitei decoder 13 that accomplishes the above-described four-value four-status Viterbi decoding method will be described. The Viterbi decoder 13 comprises a branch metric calculating circuit (BMC) 20, an adding, comparing, and selecting circuit (ACS) 21, a compression and latch circuit 22, and a path memory unit (PMU) 23. The above-described read block pulses DCK (simply referred to as clock pulses) are supplied to individual structural portions of the decoder 13 so as to match the operation timings of the structural portions of the entire Viterbi decoder 13. Next, the structural portions of the Viterbi decoder 13 will be described one after the other.

The BMC 20 calculates values BM0, BM1, BM2, and BM3 of branch metrics corresponding to standardized path metrics based on an input reproduced signal z[k]. The values BM0 to BM3 are required to calculate the standardized path metrics in Formulas (20) to (23). The values BM0 to BM3 are expressed as follows.

$$BM0\ z(k) \quad (26)$$

$$BM1=\alpha \times z[k]-\beta \quad (27)$$

$$BM2=-z(k) \quad (28)$$

$$BM3=-\alpha \times z[k]-\beta \quad (29)$$

where $\alpha$ and $\beta$ are reference values calculated corresponding to Formulas (24) and (25) by the BMC 20. In these calculations, an envelop is detected corresponding to for example a reproduced signal [k]. $\alpha$ and $\beta$ are calculated corresponding to identification points −A−B, −A, A, and A+B that is detected by an envelop detecting method corresponding to the reproduced signal z[k] and that is supplied to the BMC 20.

The values BM0 to BM3 are supplied to the ACS 21. On the other hand, the ACS 21 receives values M0, M1, M2, and M3 (that have been compressed) of standardized path metrics one clock pulse prior from the compression and latch circuit 22. By adding the values M0 to M3 and BM0 to BM3, the values L0, L1, L2, and L3 of the latest standardized path metrics are calculated. Since the values M0 to M3 have been compressed, L0 to L3 can be prevented from overflowing.

The ACS 21 selects the maximum likelihood status transition (that will be described later) corresponding to the values L0 to L3 of the latest standardized path metrics. Corresponding to the selected result, the signal levels of the selection signals SEL0 and SEL2 supplied to the path memory 23 become "High" or "Low".

The ACS 21 supplies the values L0 to L3 to the compression and latch circuit 22. The compression and latch circuit 22 compresses the values L0 to L3 and then latches them. Thereafter, the ACS 21 supplies the compressed values L0 to L3 as standardized path metrics M0 to M3 one clock pulse prior to the ACS 21.

As an example of the compressing method, one (for example, L0) of the latest standardized path metrics L0 to L3 is subtracted therefrom in the following manner.

$$M0=L0-L0 \quad (30)$$

$$M1=L1-L0 \quad (31)$$

$$M2=L2-L0 \quad (32)$$

$$M3=L3-L0 \quad (33)$$

As a result, M0 is always 0. However, in the following description, to keep the generality, M0 is represented as it is. The differences of the values M0 to M3 calculated by Formulas (30) to (33) are equal to the differences of the values L0 to L3. As described above, in the selection of the maximum likelihood status transition, only the differences of the values of the standardized path metrics are important. Thus, such a compressing method is effective for a method for compressing the values of the standardized path metrics without affecting the selected result of the maximum likelihood status transition and for preventing L0 to L3 from overflowing. In such a manner, the ACS 21 and the compression and latch circuit 22 compose a loop with respect to calculations of standardized path metrics.

Figure 11:
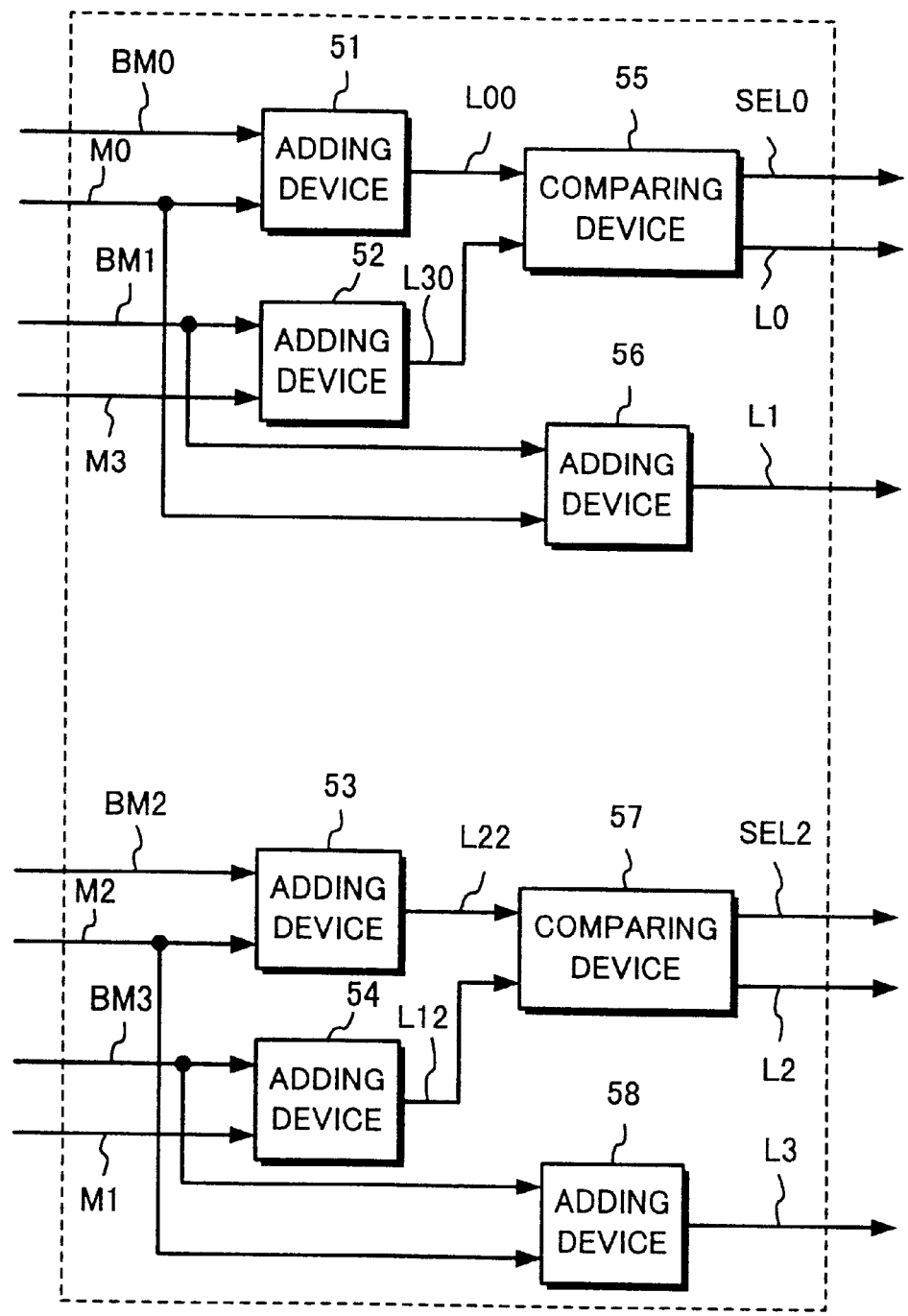
FIG. 11 is a block diagram showing the structure of a part of the Viterbi decoder shown in FIG. 10.

Next, with reference to FIG. 11, the ACS 21 will be described in detail. The ACS 21 is composed of six adding devices 51, 52, 53, 54, 56, and 58 and two comparing devices 55 and 57. On the other hand, values M0 to M3 of compressed standardized path metrics one clock pulse prior and values BM0 to BM3 of branch metrics corresponding thereto are supplied to the ACS 21.

The values M0 and BM0 are supplied to the adding device 51. The adding device 51 adds the values M0 and BM0 and outputs L00 that is expressed as follows.

$$L00=M0+BM0 \quad (34)$$

As described above, the value M0 is a compressed standardized path metric corresponding to the sum of status transitions in the status S0 at the time point k−1. The value BM0 is calculated with the reproduced signal z[k] at the time point k corresponding to Formula (26). The value BM0 is the value z[k]. Consequently, the value of Formula (34) is a calculated value of m(0, k−1)+z[k] (that has been compressed) in Formula (20). In other words, the value of Formula (34) is a calculated value in the case that the status S0 at the time point k−1 changes to the status S0 at the time point k by a status transition S0

On the other hand, the values M3 and BM1 are supplied to the adding device 52. The adding device 52 adds the values M3 and BM1 and outputs L30 that is expressed as follows.

$$L30=M3+BM1 \quad (35)$$

As described above, the value M3 is a compressed standardized path metric corresponding to the sum of status transitions in the case that the status at the time point k−1 is S3. The value BM1 is calculated with the reproduced signal z[k] at the time point k corresponding to Formula (27). Thus, The value BM1 is expressed by $\alpha \times z[k]-\beta$. Consequently, the value of Formula (35) is a calculated value of m(3, k−1)+α×z[k]−β (that has been compressed) in Formula (20). In other words, the value of Formula (35) is a calculated value in the case that the status S3 at the time pint k−1 changes to the status S0 at the time point k by a status transition S3→S0.

The values L00 and L30 are supplied to the comparing device 55. The comparing device 55 compares the values L00 and L30 and treats the smaller value as the latest standardized path metric L0. In addition, corresponding to the selected result, as described above, the comparing device 55 changes the signal level of the selection signal SEL0. This structure corresponds to the selection of the minimum value in Formula (20). In other words, when L00<L30 (in this case, the status transition S0→S0 is selected), the comparing device 55 outputs the value L00 as the values L0 and causes the signal level of the selection signal SEL0 to be for example "Low". On the other hand, when L30<L00 (in this case, the status transition S3→S0 is selected), the comparing device 55 outputs the value L30 as the value L0 and causes the signal level of the selection signal SEL0 to be for example "High". As will be described later, the selection signal SEL0 is supplied to an A type path memory 24 (that will be described later) corresponding to the status S0.

As described above, the adding devices 51 and 52 and the comparing device 55 select the maximum likelihood status transition at the time point k from the status transitions S0→S0 and S3→S0 corresponding to Formula (20). Corresponding to the selected result, the comparing device 55 outputs the latest standardized path metric L0 and the selection signal SEL0.

The values M0 and BM1 are supplied to the adding device 56. The adding device 51 adds the values M0 and BM1 and outputs L1 expressed as follows.

$$L1 = M0 + BM1 \tag{36}$$

As described above, the value M0 is a compressed standardized path metric corresponding to the sum of the status transitions in the case that the status at the time point k−1 is S0. The value BM1 is calculated with the reproduced signal z[k] at the time point k corresponding to Formula (27). Namely, the value BM1 is expressed by a×z[k]−β. Thus, the value of Formula (36) is a calculated value of the right side m(0, k−1)+α×z[k]−β (that has been compressed) in Formula (21). In other words, the value of Formula (36) is a calculated value in the case that the status S0 at the time point k−1 changes to the status S1 at the time point k by a status transition S0→S1. In Formula (21), a value is not selected. Thus, the output data of the adding device 56 is the latest standardized path metric L1.

The values M2 and BM2 are supplied to the adding device 53. The adding device 53 adds the values M2 and BM2 and outputs L22 expressed as follows.

$$L22 = M2 + BM2 \tag{37}$$

As described above, the value M2 is a compressed standardized path metric corresponding to the sum of status transitions in the case that the status at the time point k−1 is S2. The value BM0 is calculated with the reproduced signal z[k] at the time point k corresponding to Formula (28). In other words, the value BM0 is −z[k]. Thus, the value of Formula (37) is a calculated value of m(2, k−1)−z[k] (that has been compressed) in Formula (22). In other words, the value of Formula (37) is a calculated value in the case that the status S2 at the time point k changes to the status S2 by a status transition S2→S2.

On the other hand, the values M1 and BM3 are supplied to the adding device 54. The adding device 53 adds the values M1 and BM3 and outputs L12 expressed as follows.

$$L12 = M1 + BM3 \tag{38}$$

As described above, the value M1 is a compressed standardized path metric corresponding to the sum of status transitions in the case that the status at the time point k−1 is S1. The value BM3 is calculated with the reproduced signal z[k] at the time point k corresponding to Formula (29). In other words, the value BM3 is expressed by −α×z[k]−β. Thus, the value of Formula (38) is a calculated value of m(1, k−1)−α×z[k]−β (that has been compressed) in Formula (22). In other words, the value of Formula (38) is a calculated value in the case that the status S1 at the time point k−1 changes to the status S2 at the time point k by a status transition S1→S2.

The values L22 and L12 are supplied to the comparing device 57. The comparing device 57 compares the values L2 and L12, treats the smaller value as the latest standardized path metric L2, and changes the signal level of the selection signal SEL2 corresponding to the selected result. This structure corresponds to the selection of the minimum value in Equation (22). In other words, when L22<L12 (in this case, the status transition S2→S2 is selected), the comparing device 57 outputs the value L22 as L2 and causes the signal level of the selection signal SEL2 to be for example "Low". On the other hand, when L12<L22 (in this case, the status transition S1→S2 is selected), the comparing device 57 outputs the value L12 as L2 and causes the signal level of the selection signal SEL2 to be for example "High". As will be described later, the selection signal SEL2 is supplied to an A type path memory 26 that corresponds to the status S2.

The adding devices 53 and 54 and the comparing device 57 select the maximum likelihood status transition at the time period k from the status transitions S1→S2 and S2→S2 corresponding to Formula (22). The comparing device 57 outputs the latest standardized path metric L2 and the selection signal SEL2 corresponding to the selected result.

The values M2 and BM3 are supplied to the adding device 58. The adding device 58 adds the values M2 and BM3 and outputs L3 expressed as follows.

$$L3 = M2 + BM3 \tag{39}$$

As described above, the value M2 is a compressed standardized path metric corresponding to the sum of status transitions in the case that the status at the time point k−1 is S2. The value BM3 is calculated with the reproduced signal z[k] at the time point k corresponding to Formula (29). In other words, the value BM3 is expressed by −α×z[k]−β. Thus, the value of Formula (23) is a calculated value of the right side m(2, k−1)+α×z[k]−β (that has been compressed) in Formula (23). In other words, the value of Formula (23) is a calculated value in the case that the status S0 at the time point k−1 changes to the status S3 at the time point k by a status transition S2→S3. In Formula (23), a value is not selected. Thus, the output data of the adding device 58 is the latest standardized path metric L3.

As described above, since the path memory unit (PMU) 23 operates corresponding to the selection signals SEL0 and SEL2 received from the ACS 21, decoded data a'[k] as the maximum likelihood decoded data sequence according to the recorded data a[k] is generated. The PMU 23 is composed of two A type bus memories and two B type bus memories that correspond to status transitions of four status shown in FIG. 7.

An A type path memory has two transitions to a particular status (namely, a transition from the particular status to the same status and a transition from another status to the particular transition). In addition, the A type path memory has a structure corresponding to two transitions starting from the particular status (namely, a transition from the particular status to the same status and a transition from the particular status to another status). Thus, the A type path memory corresponds to the two statuses S0 and S2 of the four statuses shown in FIG. 7.

On the other hand, a B type path memory has one transition to a particular status. In addition, the B type path memory has a structure corresponding to one transition starting from the particular status. Thus, the B type path memory corresponds to the status S1 or S3 of the four statuses shown in FIG. 7.

Figure 10:
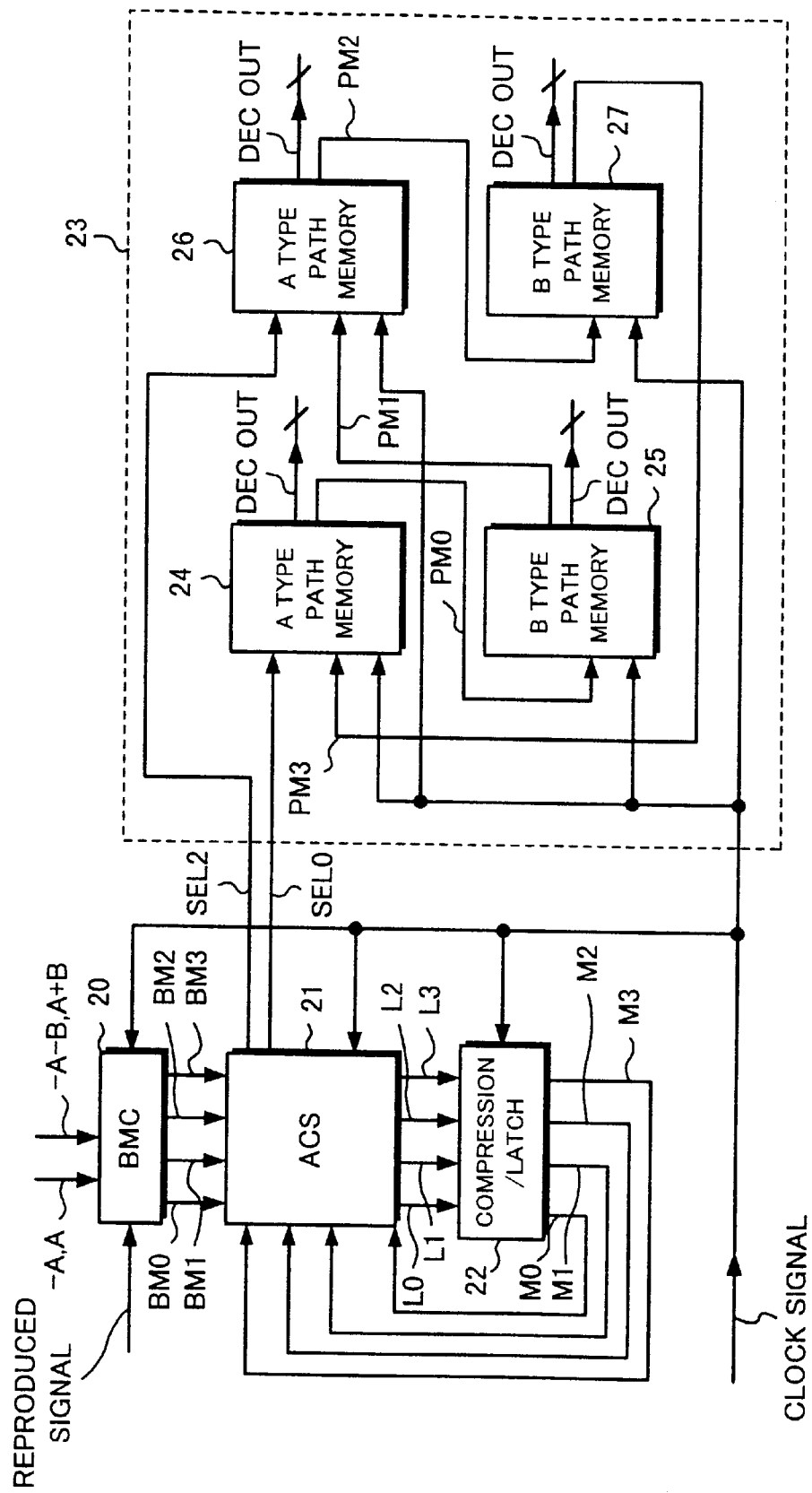
FIG. 10 is a block diagram showing the overall structure of a Viterbi decoder that performs the four-value four-status Viterbi decoding process.

The PMU 23 exchanges decoded data as shown in FIG. 10 so that the two A type path memories and the two B type path memories operate corresponding to the status transition diagram shown in FIG. 7. In other words, the A type path memories 24 and 26 correspond to the statuses S0 and S2, respectively. The B type path memories 25 and 27 correspond to the statuses S1 and S3, respectively. Thus, the status transitions starting from S0 are S0→S0 and S0→S1. The status transitions starting from S2 are S2→S2 and S2→S3. In addition, the status transition starting from S1 is only S1→S2. The status transition starting from S3 is S3→S0.

Figure 12:
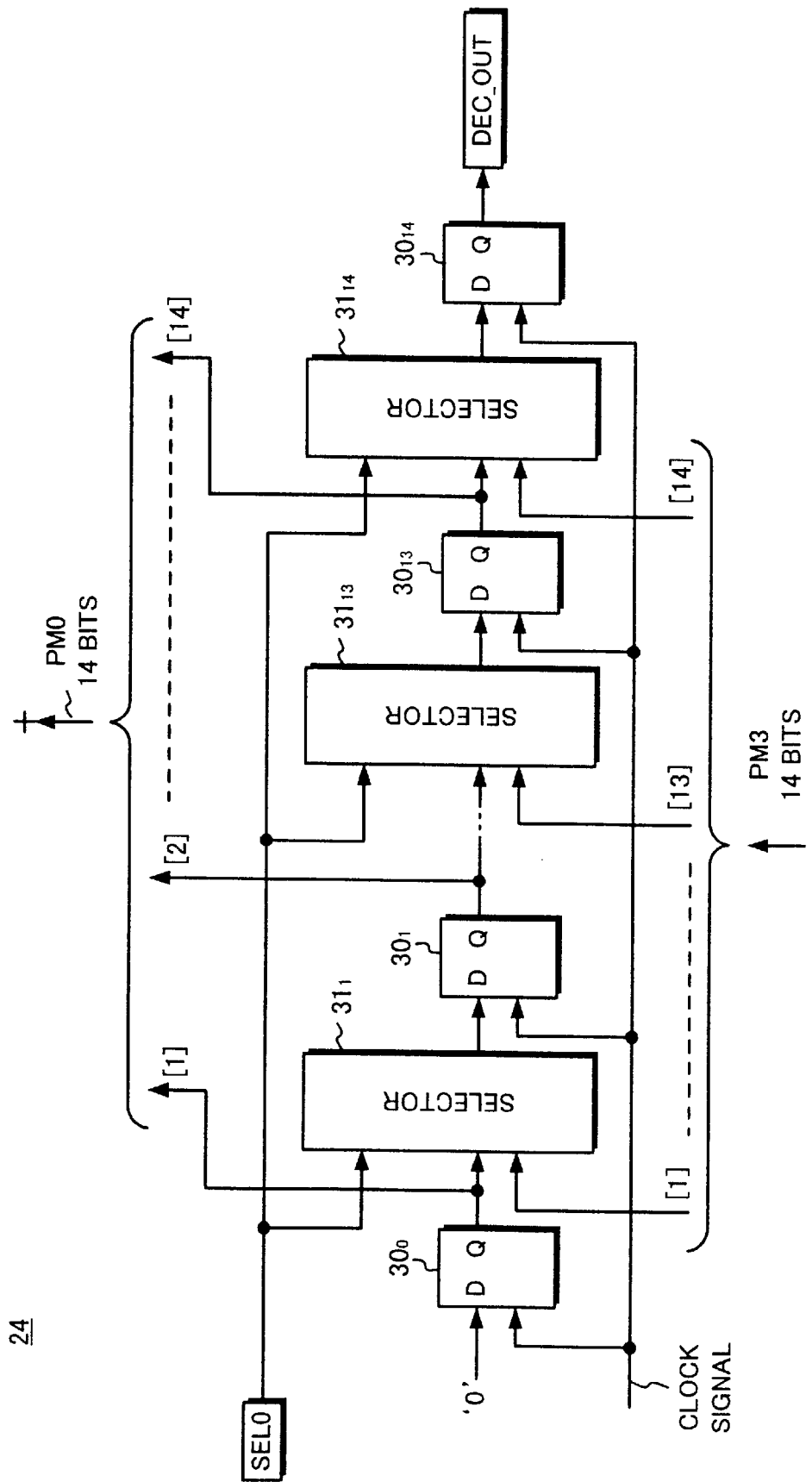
FIG. 12 is a block diagram showing the structure of another part of the Viterbi decoder shown in FIG. 10.

FIG. 12 shows the detailed structure of the A type path memory 24. The A type path memory 24 is composed of flip-flops and selectors that are alternately disposed corresponding to the length of the path memory. The structure shown in FIG. 12 has a decoded data length of 14 bits. In other words, the A bus memory 24 has 14 selectors 311 to 3114 and 15 flip-flops $30_0$ to $30_{14}$. The selectors $31_1$ to $31_{14}$ each receive two data values and selectively supplies one of them to the next stage. In addition, clock pulses are supplied to the flip-flops $30_0$ to $30_{14}$ so as to match the operation timings of the structural portions of the A type path memory 24.

As was described in FIG. 7, transitions to the status S0 are S0→S0 (where the self status is taken over) and S3→S0. In the structure that corresponds to such a situation, each selector receives data from the flip-flop on the preceding stage (namely, decoded data corresponding to the status transition S0→S0) and data received from the B type path memory 27 that corresponds to the status S3 (namely, decoded data PM3 corresponding to the status transition S3→S0) In addition, each selector receives the selection signal SEL0 from the ACS 21. Each selector supplies one of two decoded data values to the flip-flop on the next stage corresponding to the signal level of the selection signal SEL0. The decoded data value that is supplied to the flip-flop on the next stage is also supplied as PM0 to the B type path memory 25 that corresponds to the status S1.

In other words, the selector $31_{14}$ receives a data value from the flip-flop $30_{13}$ on the preceding stage and the 14-th bit of the decoded data value PM3 from the B type path memory 27. The selected data value is supplied to the flip-flop $30_{14}$ on the next stage. As described above, corresponding to the selected result, the signal level of the selection signal SEL0 is set to "Low" or "High". When the signal level of the selection signal SEL0 is for example "Low", a data value received from the flip-flop $30_{13}$ on the preceding stage is selected. When the signal level of the selection signal SEL0 is for example "High", the 14-th bit of the decoded data value PM3 is selected. The selected data value is supplied to the flip-flop $30_{14}$ on the next stage. The 14-th bit of the decoded data value PM0 is supplied to the B type path memory 25 that corresponds to the status S1.

The other selectors $31_{11}$ to $31_{13}$ of the A type path memory 24 operate as with the selector $31_{14}$ corresponding to the signal level of the signal level SEL0. Thus, when the selection signal SEL0 is for example "Low", the A type path memory 24 perform a serial shifting operation of which each flip-flop takes over data of the flip-flop on the preceding stage. On the other hand, when the signal level of the selection signal SEL0 is "High", the A type path memory performs a parallel loading operation of which each flip-flop takes over the decoded data value PM3 of 14 bits received from the B type path memory 27. In any case, the decoded data value that is taken over is supplied as the decoded data value PM0 of 14 bits to the B type path memory 25.

"0" is always supplied to the flip-flop $30_0$ on the first stage in synchronization with the clock signal. In each of the status transitions S0→S0 and S2→S0, as shown in FIG. 7, since the decoded data value is "0", the latest decoded data value is always "0".

As described above, the structure of the A type path memory 26 that corresponds to S2 is the same as the structure of the A type path memory 24. However, the A type path memory 26 receives the selection signal from the ACS 21. In addition, as shown in FIG. 7, there are two transitions S2→S2 (where the self status is taken over) and S1→S2. Thus, the B type path memory 25 that corresponds to the status S1 supplies the decoded value PM1 to the A type path memory 26. In addition, since the status transitions starting from S2 are S2 and S3, the A type path memory 26 supplies the decoded data value PM2 to the B type pass memory 27 that corresponds to the status S3.

"0" is always supplied to the flip-flop on the first stage of the A type path memory 26 that corresponds to the status S2 in synchronization with the clock signal. This operation in each of the status transitions S2→S2 and S1→S2 corresponds to the situation that since the decoded data value is "0", the latest decoded data value is always "0".

Figure 13:
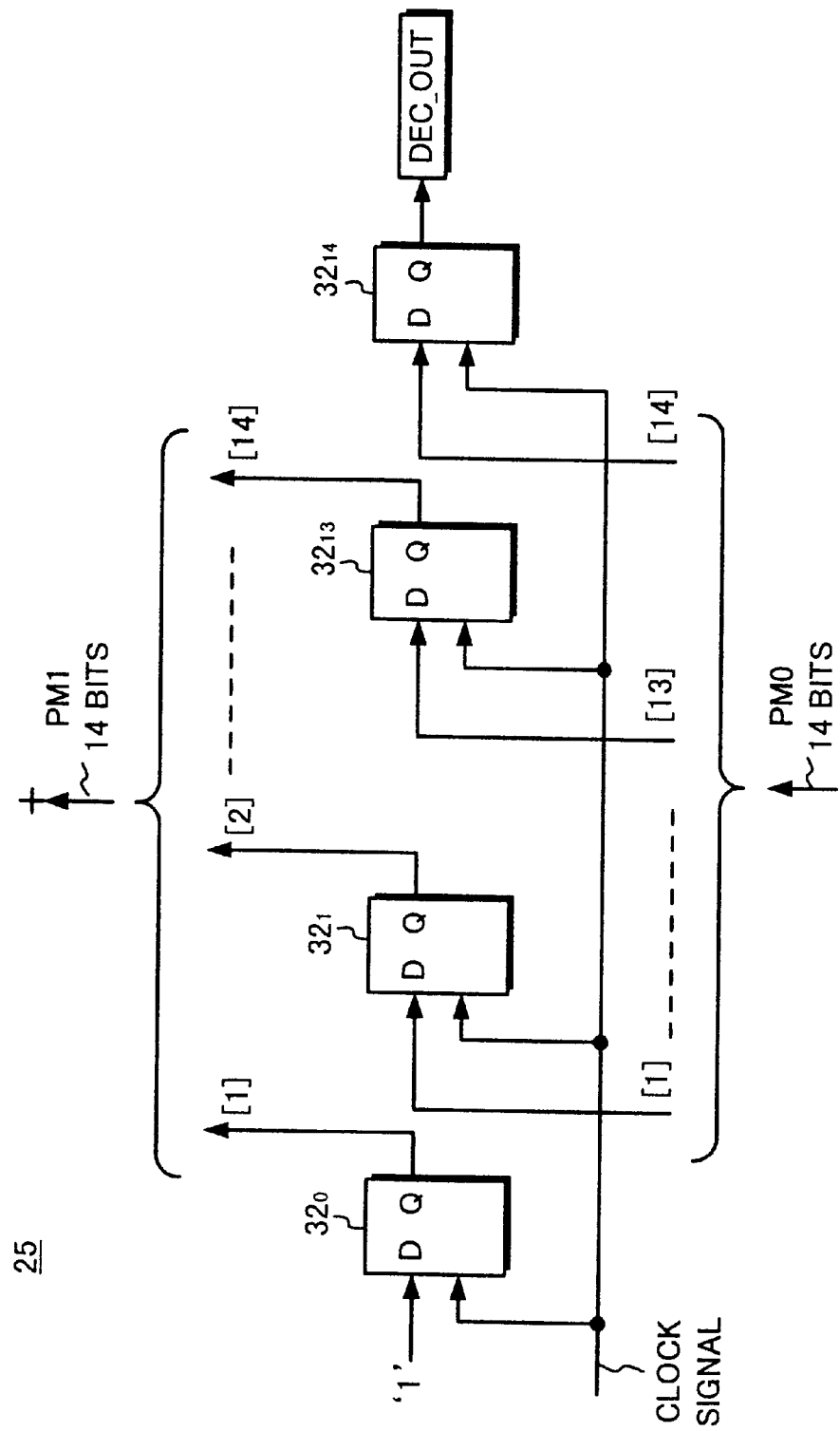
FIG. 13 is a block diagram showing the structure of a further other part of the Viterbi decoder shown in FIG. 10.

FIG. 13 shows the detailed structure of the B type path memory 25. The B type path memory 25 is composed of flip-flops corresponding to the length of the path memory. FIG. 13 shows a structure corresponding to a decoded data length of 14 bits. In other words, the B type path memory 25 has 15 flip-flops $32_0$ to $32_{14}$. Clock pulses are supplied to the flip-flops $32_2$ to $32_{14}$ so as to match the operation timings of the structural portions of the B type path memory 25.

The A type path memory 24 that correspond to the status S0 supplies a decoded data value of 14 bits as PM0 to the flip-flops $32_1$ to $32_{14}$. For example, the first bit of the decoded data value PM0 is supplied to the flip-flop $32_1$. Each of the flip-flops $31_{11}$ to $32_{14}$ stores the received value for the period of one clock pulse and supplies the stored value as a decoded data value PM1 of 14 bits to the A type path memory 26 that corresponds to the status S2. For example, the flip-flop $32_1$ outputs the second bit of the decoded data value PM1.

The other flip-flops $32_2$ to $32_{13}$ of the B type path memory 25 operate as with the flip-flop $32_1$. Thus, the B type path memory 25 receives the decoded data value PM0 of 14 bits from the A type path memory 24 and supplies the decoded data value PM1 of 14 bits to the A type path memory 26.

"1" is always supplied to the flip-flop $32_2$ in synchronization with the clock signal. This operation corresponds to the situation that when the latest status transition is S0→S1, the decoded data value is "1".

As described above, the structure of the B type path memory 27 that corresponds to the status S3 is the same as the structure of the B type path memory 25. However, as shown in FIG. 7, since the status transition to the status S3 is S2→S3, the decoded data value PM2 is supplied from the A type path memory 26 that corresponds to the status S2 to the B type path memory 27. In addition, since the status starting from the status S3 is S0, the decoded data value PM3 is supplied to the A type path memory 24 that corresponds to the status S0. In the B type path memory 27, "1" is always supplied to the flip-flop on the last stage in synchronization with the clock signal. This operation corresponds to the situation that when the latest status transition is S2→S3, the decoded data is "1" as shown in FIG. 7.

As described above, the four path memories of the PMU 23 respectively generate decoded data values. The four decoded data values are always the same when the Viterbi decoding process is accurately performed. In the real Viterbi decoding process, mismatches takes place in the four decoded data values. This situation takes place due to noise in a reproduced signal. Thus, when the identification points A and B are detected, an error takes place and thereby the Viterbi decoding process becomes inaccurate.

Generally, the probability of which the four decoded data values do not match can be lowered when the number of stages of path memories is increased. In other words, when the quality such as C/N of the reproduced signal is high, even if the number of stages of path memories is relatively small, the probability of which the four decoded data values do not match is low. On the other hand, when the quality of a reproduced signal is not high, to lower the probability of which the four decoded data values do not match, it is necessary to increase the number of stages of path memories. When the number of stages of path memories is relatively small and thereby the probability of which the four decoded data values do not match cannot be sufficiently lowered, a structure (not shown) for selecting a proper decoded data value corresponding to the rule of majority is disposed downstream of the four path memories of the PMU 23.

[Viterbi Decoding Method Other than Four-value Four-status Viterbi Decoding Method]

The above-described four-value four-status Viterbi decoding method is applied to the case that the waveform equalizing characteristic of the filter portion 11 is PR(1, 2, 1) and that RLL(1, 7) code is used for recorded data. In the conditions that the record linear density is 0.40 μm, that the laser wavelength is 685 nm, and that NA is 0.55, with a waveform equalizing characteristic PR(1, 2, 1), the four-value four-status Viterbi decoding method can be optimally used. However, another Viterbi decoding method may be used corresponding to the waveform equalizing characteristic or an encoding method for generating recorded data.

For example, in the case that the waveform equalizing characteristic is PR(1, 1) and that an RLL(1, 7) code is used for recorded data, three-value four-status Viterbi decoding method is used. On the other hand, in the case that the waveform equalizing characteristic is PR(1, 3, 3, 1) and that an RLL(1, 7) code is used for recorded data, seven-value six-status Viterbi decoding method is used. A proper Viterbi decoding methods is selected from such methods corresponding to a waveform equalizing characteristic that is properly adapted to an inter-code interference of a reproduced signal. Thus, an optimum Viterbi decoding method is selected corresponding to a record linear density and MTF.

[Four-value Four-status Viterbi Decoding Method Using Status Data]

The Viterbi decoder 13 of the magneto-optic disc apparatus shown in FIG. 1 generates decoded data as a sequence of decoded data values corresponding to the maximum likelihood status transition based on reproduced signal values. Alternatively, with status data values that represent statuses instead of decoded data values, status data that represents a status transition that is selected may be generated. In this case, instead of the path metric unit PMU used in the above-described magneto-optic disc apparatus shown in FIG. 1, a status memory unit (hereinafter referred to as SMU) that generates a sequence of status data values is described. As will be described later, in an embodiment of the present invention, the extracting timing of a phase error of the PLL is generated corresponding to a status transition represented as such status data.

Figure 14:
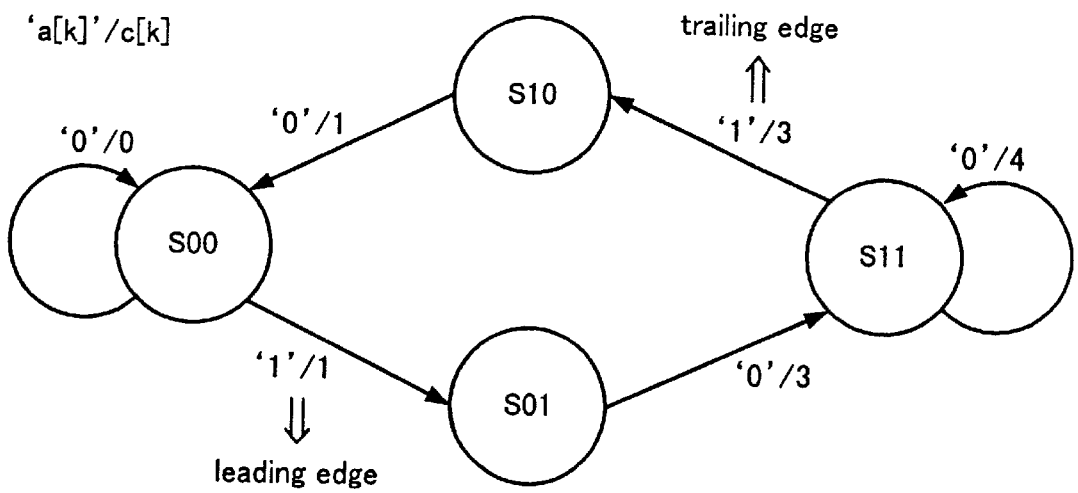
FIG. 14 is a schematic diagram showing an example of a status transition diagram of a four-value four-status Viterbi decoding method in a different denoting method from that shown in FIG. 7.

In the four-value four-status Viterbi decoding method, since four statuses can be represented with two bits, two-bit data can be used as status data values. Thus, S0, S1, S2, and S3 in FIG. 7 can be denoted by two-bit status data values 00, 01, 11, and 10, respectively. In the following description, S0, S1, S2, and S3 in FIG. 7 are denoted by S00, S01, S1, and S10, respectively. In this case, a status transition diagram shown in FIG. 14 is used in the four-value four-status Viterbi decoding method instead of the status transition diagram shown in FIG. 7.

In the following description, a standardized waveform equalizing characteristic PR(1, 2, 1) is used instead of the above-described waveform equalizing characteristic PR(B, 2A, B). Thus, reproduced signal values c[k] calculated without consideration of values of identification points (namely, noise) are denoted by 0, 1, 3, and 4 instead of −A−B, −A, A, and A+B in FIG. 7.

In Formulas (20) to (24) for calculating standardized path metrics, six addition portions corresponding to the latest status transitions (for example, in Formula (20), z[k] corresponding to a status transition S0→S0 and α×z[k]−β corresponding to a status transition S3→S0) are denoted as follows corresponding to the denoting method of statuses shown in FIG. 14. Although the addition portions are different from branch metrics defined by Formula (13), for simplicity, the addition portions are represented by branch metrics.

Figure 15:
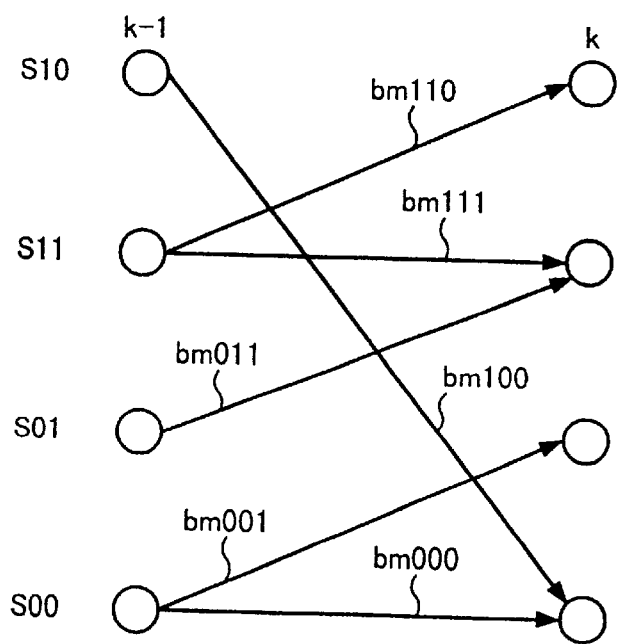
FIG. 15 is a schematic diagram for explaining a denoting method of branch metrics.

A status before a transition is represented by two bits. Likewise, a status after a transition is represented by two bits. By adding these two status values, a sequence of four bits is obtained. The second and third bits are represented by one bit. With the resultant three bits, a branch metric that takes place in one read clock period is represented. For example, a branch metric corresponding to a status transition S11→S10 is denoted by bm110. In such a manner, branch metrics corresponding to six status transitions shown in FIG. 14 can be represented as shown in FIG. 15.

Figure 16:
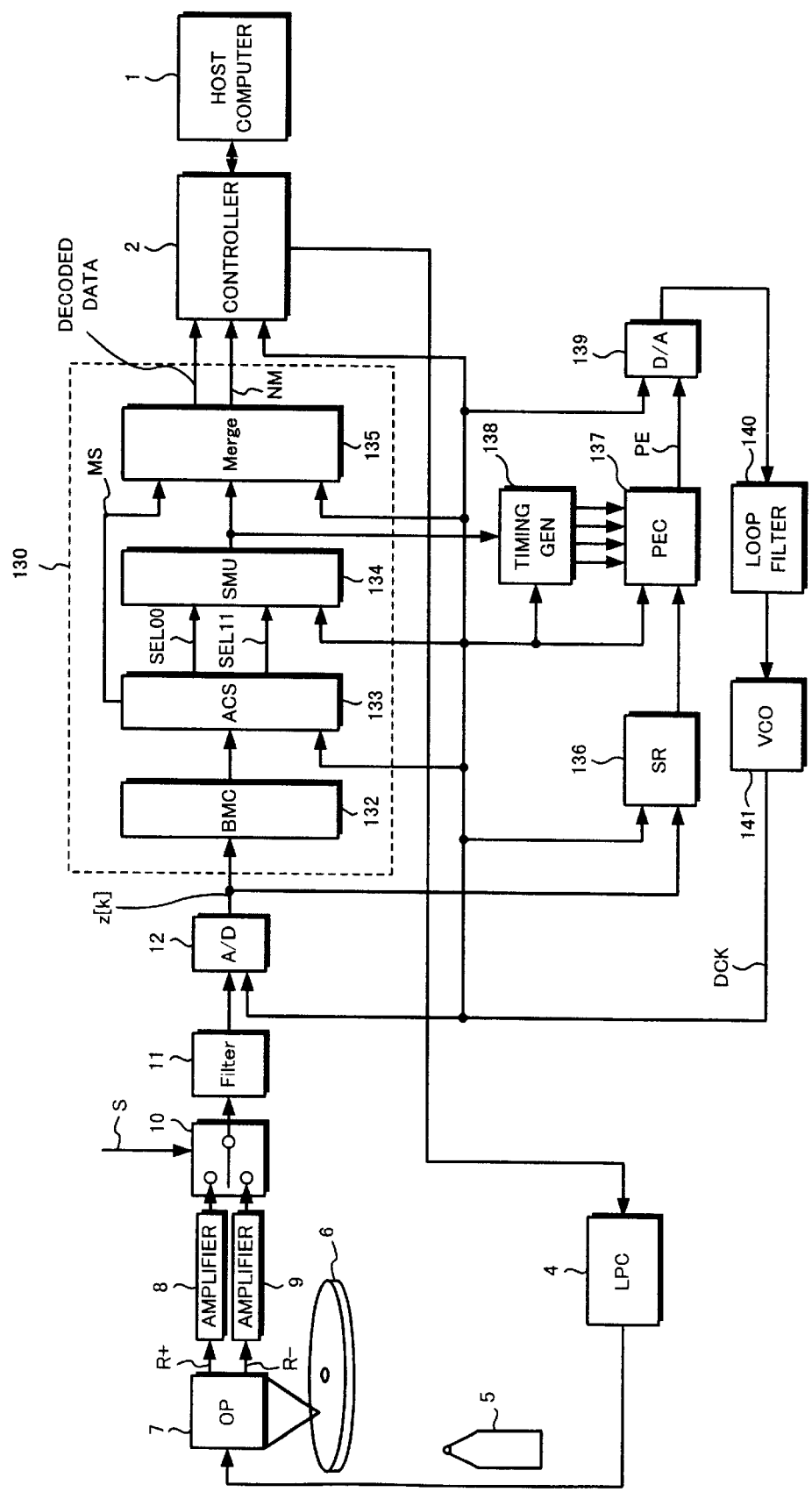
FIG. 16 is a block diagram showing the overall structure of an embodiment of the present invention.

FIG. 16 is a block diagram showing the overall structure of a magneto-opto disc apparatus according to an embodiment of the present invention. For simplicity, in FIG. 16, similar portions to those in FIG. 1 are denoted by similar reference numerals. The structures of the recording system and a servo system (not shown) are the same as those in FIG. 1. The structure and operation of a circuit block of the reproducing system ranging from an optical pickup 7 to an A/D converter 12 are the same as those in FIG. 1.

A Viterbi decoder 130 generates decoded data and a mismatch detection signal NM corresponding to a reproduced signal value z[k] received from an A/D converter 12 and supplies the generated data an signal to a controller 2. As with the magneto-optic disc apparatus shown in FIG. 1, the controller 2 performs a decoding process corresponding to the supplied decoded data and reproduces user data, address data, and so forth. The controller 2 has a counting means. The counting means counts the number of mismatches of status data corresponding to the mismatch detection signal NM.

The Viterbi decoder 130 is composed of a BMC 132, an ACS 133, an SMU 134, and a merge block 135. The read clock pulses DCK (hereinafter, simply referred to as clock pulses) are supplied from the PLL 14 to these structural portions so as to match the operation timings thereof.

The BMC 132 calculates branch metrics and supplies the calculated branch metrics to an ACS 133.

Figure 17:
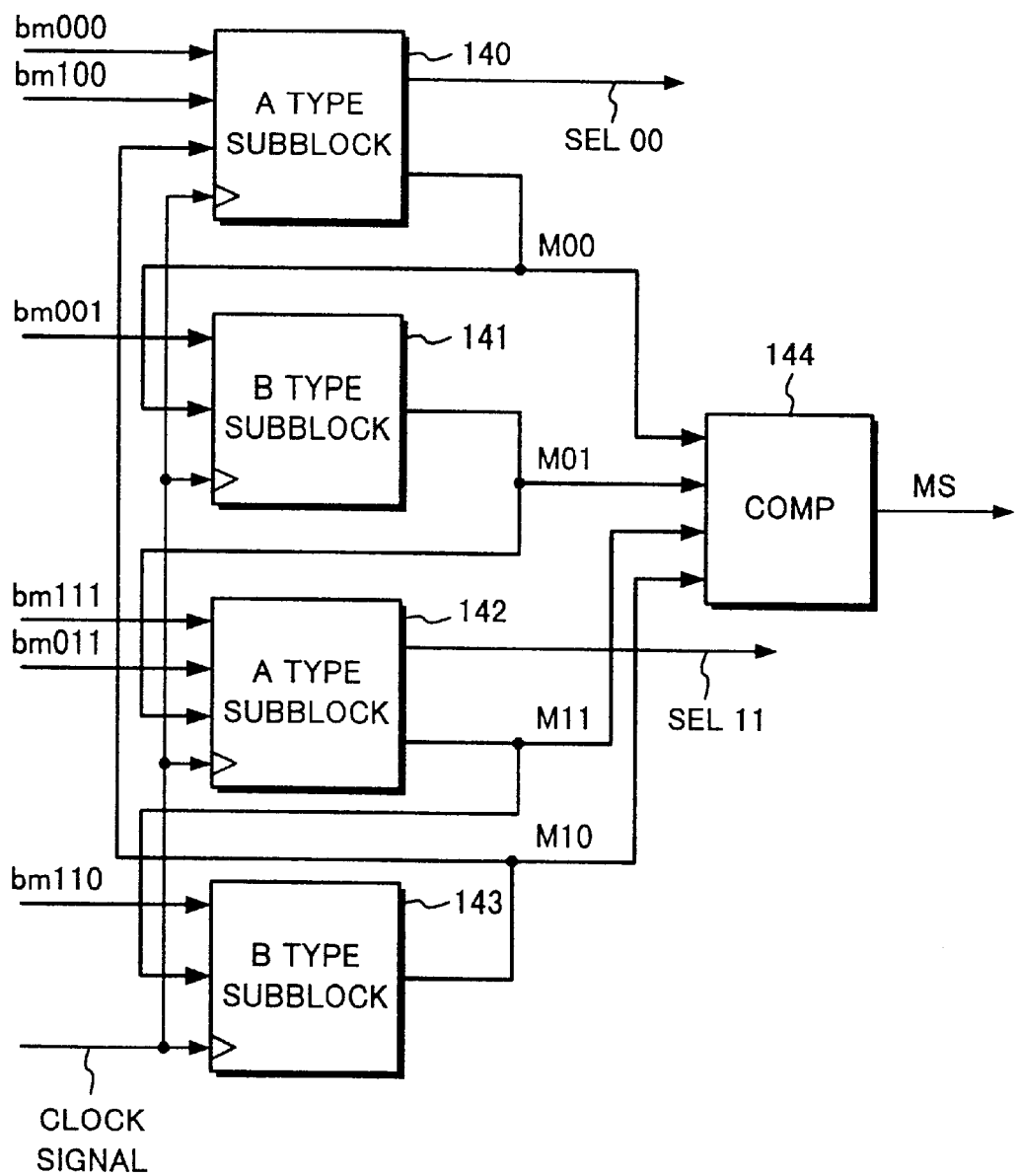
FIG. 17 is a block diagram showing an example of the structure of an ACS (Adding, Comparing, and Selecting circuit) corresponding to an embodiment of the present invention.

Next, with reference to FIG. 17, the structure of the ACS 133 will be described. The ACS 133 has the structure of the ACS 21 of the magneto-optic disc apparatus shown in FIG. 1 and the structure of the compression and latch circuit 22 thereof. Since the ACS 133 has four blocks corresponding to individual status. Values of standardized path metrics that are output from the sub blocks are exchanged corresponding to the status transition diagram shown in FIG. 14.

Statuses S00 and S11 that take over self statuses correspond to A type sub blocks (that will be described later). In FIG. 17, A type sub blocks 145 and 147 correspond to the statuses S00 and S11, respectively. Statuses S01 and S10 that do not take over self statuses correspond to B type sub blocks (that will be described later. In FIG. 17, B type sub blocks 146 and 148 correspond to the statuses S01 and S10, respectively.

The A type sub block 145 has the structure of a selection signal generating portion of the ACS 21 (see FIG. 11) of the magneto-optic disc apparatus shown in FIG. 1. In other words, the A type sub block 145 comprises two adding devices and one comparing device. The two adding devices are used to update values of two standardized path metrics. The A type sub block 145 has a means that performs the same operation as the compression and latch circuit 22 and that stores values of updated path metrics.

A branch metric bm000 corresponding to a status transition S00→S00 and a branch metric bm100 corresponding to a status transition S10→S00 are supplied from the BMC 132 to the A type sub block 145 corresponding to clock pulses. In addition, the value of a standardized path metric M10 updated one clock period prior is supplied from the B type sub block 148 corresponding to the status S10 to the A type sub block 145. The A type sub block 145 adds the value of the standardized path metric M10 updated one clock period prior and the value of the branch metric bm000 so as to calculate the sum of the likelihood in the case that the latest status transition is S10→S00.

In addition, the A type sub block 145 adds the value of the standardized path metric M00 updated one clock period prior and latched therein and the value of the branch metric bm000 so as to calculate the sum of the likelihood in the case that the latest status transition is S00→S00.

The A type sub block 145 compares the two sums of the likelihood and selects the maximum likelihood status transition. The A type sub block 145 latches the sum of the likelihood corresponding to the selected status transition as the value of the standardized path metric M00 and outputs a selection signal SEL00 corresponding to the selected result. The value of the updated standardized path metric M00 is latched by the A type sub block 145 and also supplied to the B type sub block 146 corresponding to the status S01.

The structure of the A type sub block 147 corresponding to the status S11 is the same as the structure of the A type sub block 145. However, a branch metric bm111 corresponding to a status transition S11→S11 and a branch metric bm011 corresponding to a status transition S01→S11 shown in FIG. 14 are supplied to the A type sub block 147. An updated standardized path metric M11 is latched by the A type sub block 147 and also supplied to the B type sub block corresponding to the status S10.

The B type sub block 146 has the structure of a portion that does not generate a selection signal and that is used in the ACS 21 (see FIG. 11) of the magneto-optic disc apparatus shown in FIG. 1. In other words, the B type sub block 146 has one adding device. The adding device is used to update the value of one path metric. In addition, the B type sub block 146 has a means that has the same function as the compression and latch circuit 22 and that stores the value of an updated path metric.

A branch metric bm001 corresponding to a status transition S00→S01 is supplied from the BMC 132 to the B type sub block 146 corresponding to clock pulses. In addition, the value of the standardized path metric M00 updated one clock period prior is supplied from the A type sub block 145 to the B type sub block 146. The B type sub block 146 adds the value of the standardized path metric M00 updated one clock period prior and the value of the branch metric bm001 so as to calculate the sum of the likelihood in the case that the latest status transition is S00→S01. The B type sub block 146 latches the calculated result as an updated standardized path metric M01. The value of the standardized path metric M01 is supplied to the A type sub block 147 corresponding to the status S11 at timings of clock pulses.

The structure of the B type sub block 148 corresponding to the status S10 is the same as the structure of the B type sub block 146. However, a branch metric bm110 corresponding to a status transition S11→S10 is supplied to the B type sub block 148. An updated standardized path metric M10 is latched by the B type sub block 146 and also supplied to the A type sub block 145 corresponding to the status S00.

In addition, each of the sub blocks supplies the value of the standardized path metric updated at each time point corresponding to each clock pulse to a standardized path metric comparing circuit 149. In other words, the A type sub block 145, the B type sub block 146, the A type sub block 147, and the B type sub block 148 supply the values of the standardized path metrics M00, M0, M11, and M10 to the standardized path metric comparing circuit 149, respectively. The standardized path metric comparing circuit 149 outputs a two-bit signal MS corresponding to the minimum value of the four standardized path metrics to a merge block 135 (that will be described later).

Next, with reference to FIG. 18, the SMU 134 will be described. Unlike with the PMU 23 of the magneto-optic disc apparatus shown in FIG. 1, the SMU 134 processes two-bit status data values instead of one-bit status data values.

Figure 18:
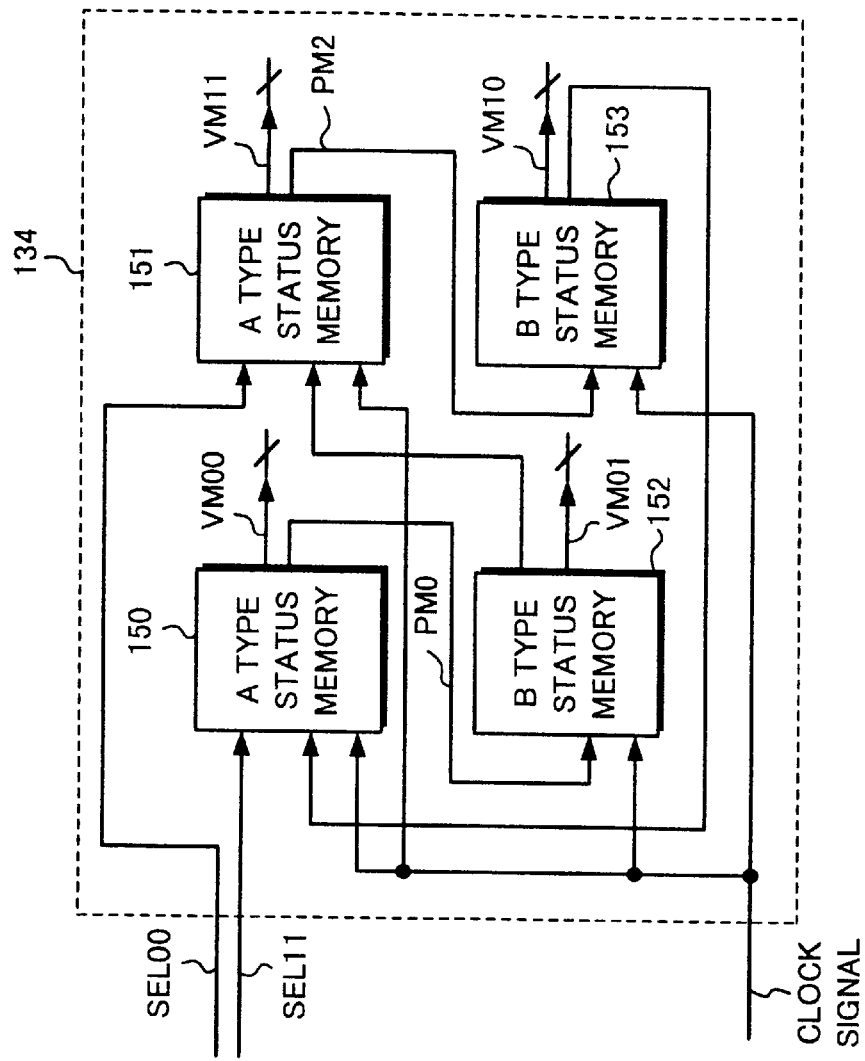
FIG. 18 is a block diagram showing an example of the structure of a status memory unit (SMU) according to an embodiment of the present invention.

As shown in FIG. 18, the SMU 134 has two A type status memories 150 and 151 and two B type status memories 152 and 153. In the SMU 134, signal lines for supplying selection signals SEL00 and SEL11, a clock signal, and status data are connected among the status memories. The A type status memories 150 and 151 correspond to the statuses S00 and S11, respectively. The B type status memories 152 and 153 correspond to the statuses S01 and S10, respectively. The four status memories are mutually connected corresponding to the status transition diagram shown in FIG. 14.

Figure 19:
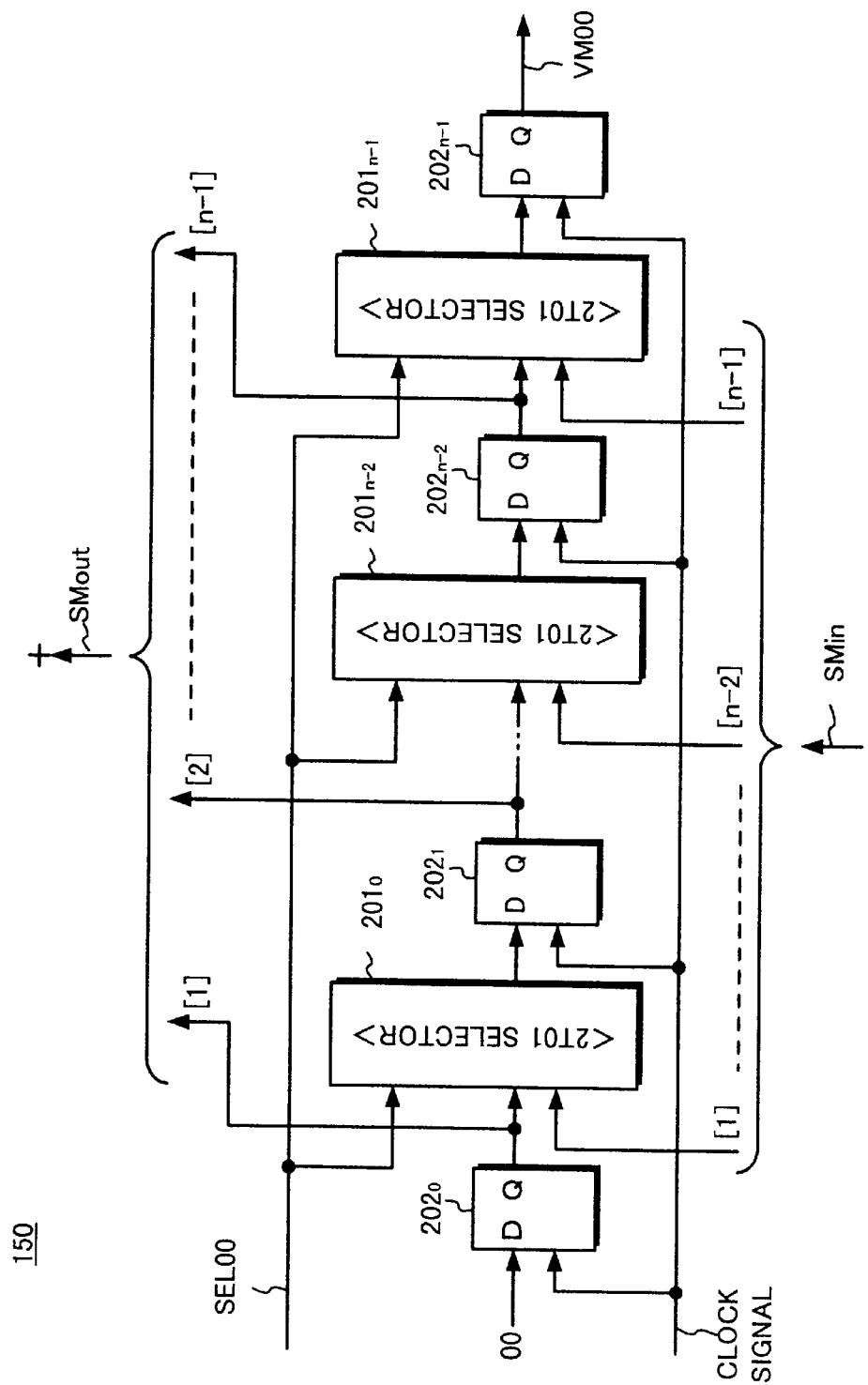
FIG. 19 is a block diagram for explaining the structure of a part of the SMU shown in FIG. 18.

Next, with reference to FIG. 19, the A type status memory 150 corresponding to the status S00 will be described. The A type status memory 150 has n processing stages. In other words, the A type status memory 150 has n selectors $201_0 \ldots 201_{n-1}$ and n registers $202_0 \ldots 202_{n-1}$ that are alternately connected. The selection signal SEL00 is supplied to the selectors $201_0$ to $201_{n-1}$. As described above, status data that is taken over from the B type status memory 153 that corresponds to the status S10 is supplied as SMin of n bits to each selector. Status data that is taken over to the B type status memory 152 that corresponds to the status S01 is output as SMout composed of (n−1) status data values to each register. In addition, clock pulses are supplied to the registers $202_0$ to $202_{n-1}$.

Next, the operation of each selector will be described. As shown in FIG. 14, statuses that change to the status S00 (namely, statuses one clock pulse prior) are S00 and S10. When a status one clock pulse prior is S00, a status transition where the self status is taken over takes place. Thus, "00" is input as the latest status data value of the status data values (as the serial shifting operation) to the selector $201_0$ on the first stage. In addition, the latest status data value SMin[1] of the status data values received from the B type status memory 153 is supplied as the parallel loading operation to the selector $201_0$. The selector $201_0$ supplies one of the two status data values to the register $202_0$ on the next stage corresponding to the selection signal SEL00.

Each of the selectors $201_1$ to $201_{n-1}$ on the second and later stages receives one status data value from the B type status memory 153 that corresponds to the status S10 as the parallel loading operation and one status data value from the register on the preceding stage as the serial shifting operation. Each of the selectors $201_1$ to $201_{n-1}$ supplies a status data value that is determined as the maximum likelihood corresponding to the selection signal SEL00 to the register on the next stage. Since all the selectors $201_0$ to $201_{n-1}$ operate corresponding to the same selection signal SEL00, a status data value as the maximum likelihood status data value selected by the ACS 133 is taken over.

In addition, the registers $202_0$ to $202_{n-1}$ obtain the supplied status data values corresponding to the clock pulses and update the stored status data values. Output data values of the individual registers are supplied to status memories corresponding to statuses that are changed one clock period later. In other words, since the status S00 changes to the same status S00, output data values of the registers are supplied to the selector on the next stage as the serial shifting operation. In addition, the output data values of the registers are supplied as the parallel loading operation to the B type status memory 152 that corresponds to the status S01. The register $202_{n-1}$ on the last stage outputs a status data value VM00.

The structure of the A type status memory 151 that corresponds to the status S11 is the same as the structure of the A type status memory 150. However, a status data value is supplied from the B type status memory 152 that corresponds to the status S01 to the A type status memory 151 as the parallel loading operation corresponding to the status transition S01→S11 shown in FIG. 14. In addition, a status data value is supplied from the A type status memory 151 to the B type status memory 153 that corresponds to the status S10 as the parallel loading operation corresponding to the status transition S11→S10 shown in FIG. 14.

Figure 20:
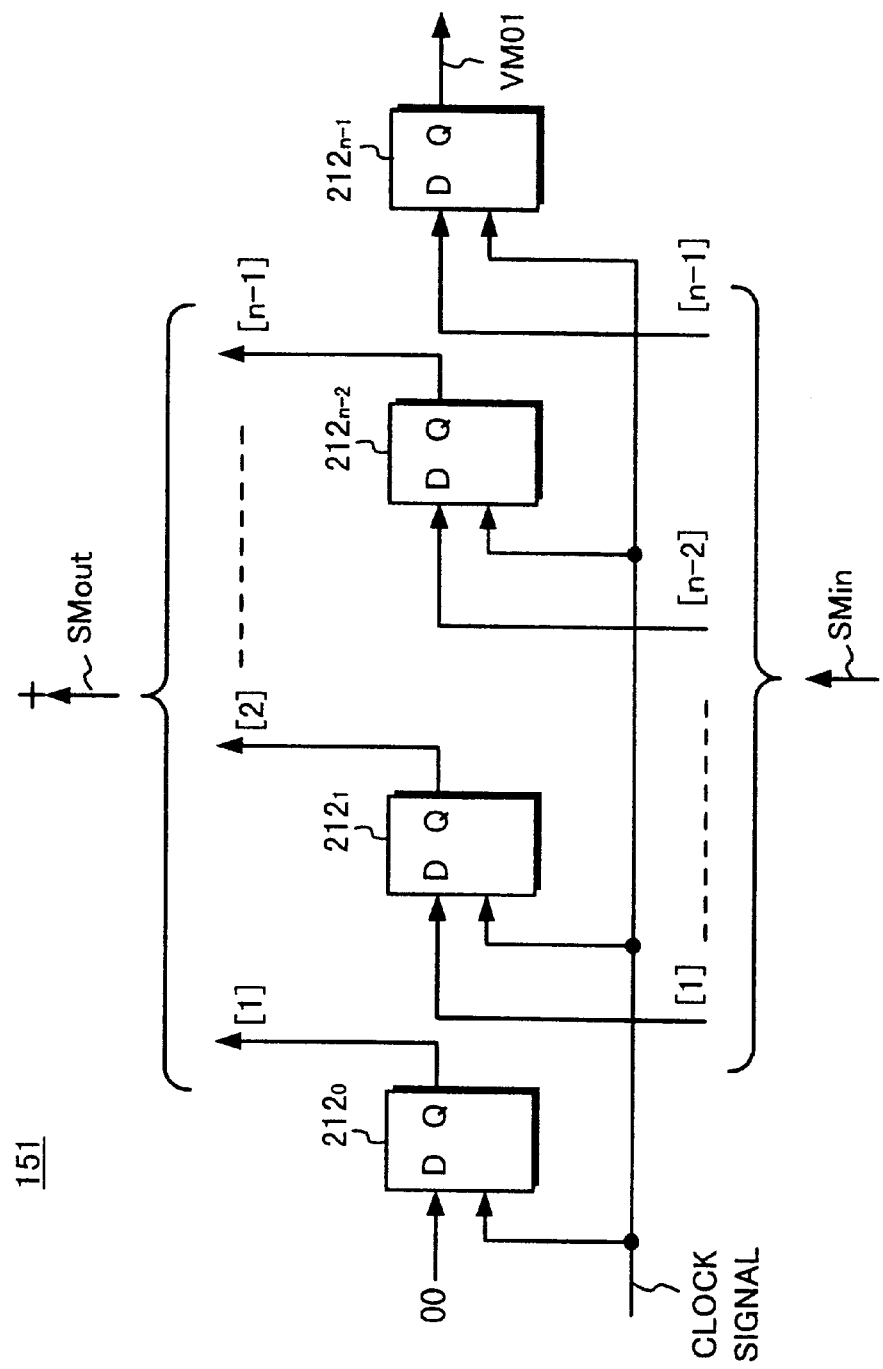
FIG. 20 is a block diagram for explaining the structure of another part of the SMU shown in FIG. 18.

Next, with reference to FIG. 20, the B type status memory 152 that corresponds to the status S01 will be described. The B type status memory 152 corresponds to a status that does not take over the self status and that has one status transition one clock period later. Thus, the B type status memory 152 neither performs the serial shifting operation, nor has selectors. In other words, the B type status memory 152 is composed of n registers $212_0, 212_1, \ldots, 212_{n-1}$. The clock pulses are supplied to the n registers $212_0, 212_1, \ldots, 212_{n-1}$ so as to match the operation timings thereof.

Status data values that are taken over from the A type status memory 150 that corresponds to the status S00 are supplied as SMin composed of (n−1) status data values to the registers $212_0, 212_1, \ldots, 212_{n-1}$. However, "00" is always input to the register $212_0$ on the first processing stage corresponding to clock pulses. This operation corresponds to the situation that the latest status that changes to S01 is always S00 as shown in FIG. 14. The registers $212_0$ to $212_{n-1}$ store status data values corresponding to the clock pulses and thereby update the stored status data values. In addition, output data values of the registers $212_0$ to $212_{n-1}$ are supplied as status data SMout composed of (n−1) status data values to the A type status memory 151 that corresponds to the status S11 that takes place one clock period later. The register $212_{n-1}$ on the last stage outputs a status data value VM01.

The structure of the B type status memory 153 that corresponds to the status S10 is the same as that of the B type status memory 152. However, a status data value is supplied from the A type status memory 151 that corresponds to the status S11 to the B type status memory 153 as the parallel loading operation corresponding to the status transition S11→S10 shown in FIG. 14. In addition, a status data value is supplied from the B type status memory 153 to the A type status memory 150 that corresponds to the status S00 as the parallel loading operation corresponding to the status transition S10→S00 shown in FIG. 14. "11" is always input to the register on the first processing stage corresponding to the clock pulses. This operation corresponds to the situation that the status (one clock pulse prior) that can change to the status S10 is S11 as shown in FIG. 14.

In the Viterbi decoding method, the status data values that the individual status memories generate match each other. Thus, the four status data values VM00, VM11, VM01, and VM10 that the four status memories of the SMU 134 generate match each other. However, if the signal quality of a reproduced RF signal deteriorates due to a bad data recording condition or a physical defect of a record medium, the four status data values VM00, VM11, VM01, and VM10 may mismatch each other. The probability of which such mismatches take place affects the performance, operation parameters, and so forth of each structural portion of the reproducing system.

On the other hand, when the signal quality of the reproduced RF signal and the reproducing conditions of the reproducing system do not vary, as the memory length of the status memories (namely, the number of process stages) is large, the probability of which mismatches of status data values take place can be decreased. However, as the memory length of status memories is large, since the circuit scale and the process amount of the SMU 134 increase, the delay time of the SMU 134 increases. Thus, it is not practical to excessively increase the memory length of the status memories. Consequently, on the assumption that there is a probability of which mismatches of status data values take place, a structure that allows the most adequate status data value to be selected in the event that mismatches take place may be provided. A merge block 135 (that will be described later) has such a structure.

In the case that the memory length of the status memories is constant, when the number of mismatches of status data values can be calculated, the counted value can be used to evaluate the quality of status data and the quality of decoded data corresponding thereto. In addition, the counted value can be used to evaluate the quality of the reproduced signal and the adaptivity of operation parameters and so forth of each structural portion of the reproducing system to the reproduced signal. The merge block 135 has a structure for counting the number of mismatches of status data values.

Figure 21:
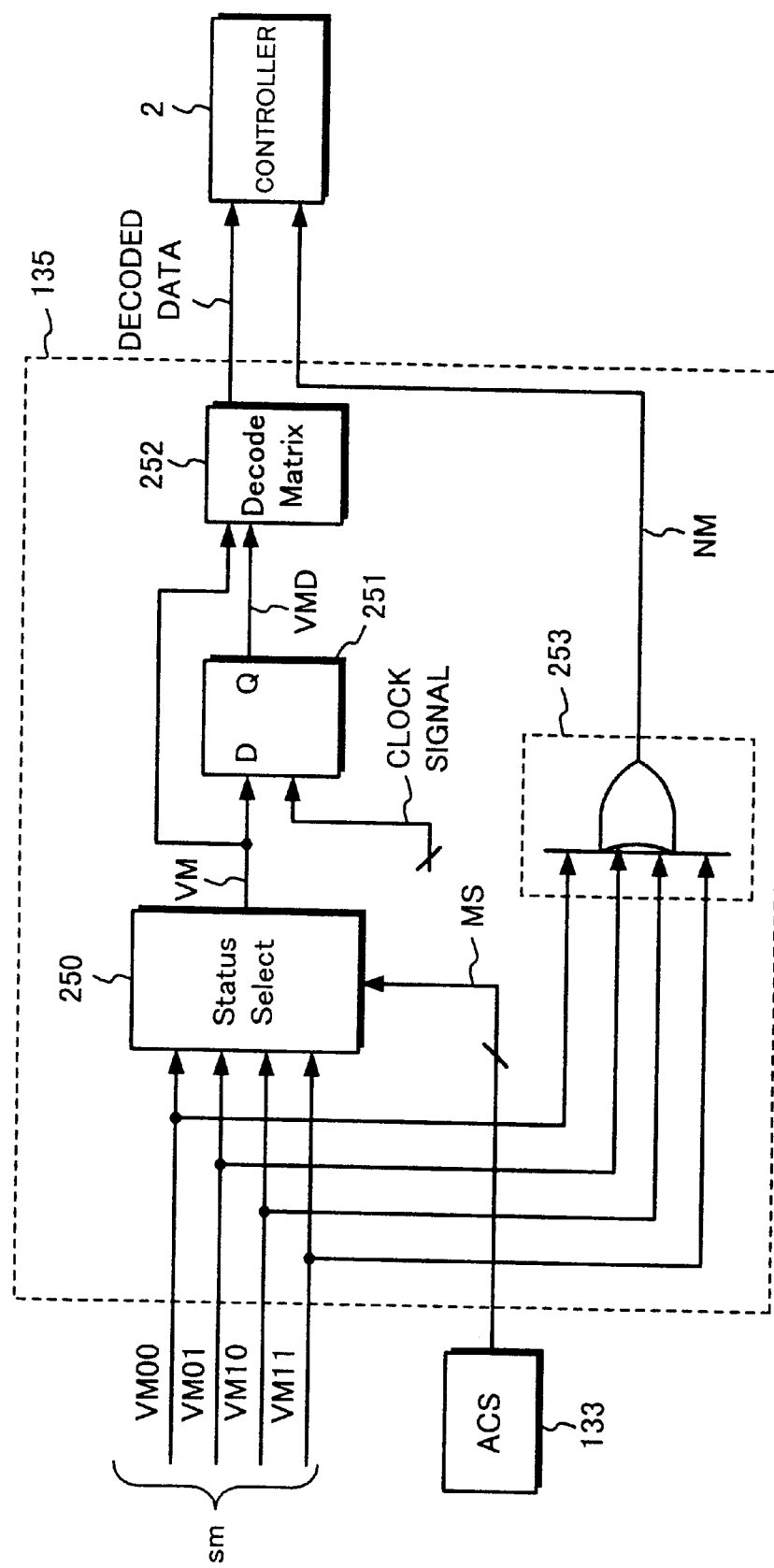
FIG. 21 is a block diagram showing an example of the structure of a merge block according to an embodiment of the present invention.

Next, with reference to FIG. 21, a merge block 135 will be described. Referring to FIG. 21, the merge block 135 comprises a status selecting circuit 250, a register 251, a decoding matrix portion 252, and an mismatch detecting circuit 253. The status selecting circuit 250 selects an adequate one of status data values VM00, VM11, VM01, and VM10 that are supplied from the SMU 134 corresponding to clock pulses. The register 251 delays the output value of the status selecting circuit 250 by one clock period. The mismatch detecting circuit 253 detects a mismatch of the status data values VM00, VM11, VM01, and VM10.

The status selecting circuit 250 references a two-bit signal MS received from the ACS 133, selects the most adequate one of the status data values VM00, VM11, VM01, and VM10, and outputs the selected status data value as VM. As shown in FIG. 22, the status selecting circuit 250 selects VM. Consequently, the probability of which the correctest status data value is selected becomes high.

The status selecting circuit 250 supplies the selected status data value VM to the register 251 and the decoding matrix portion 252. The register 251 delays the status data value VM by one clock period and supplies the resultant data value to the decoding matrix portion 252. In the following description, the output data value of the register 251 is denoted by VMD. Thus, the decoding matrix portion 252 receives the status data value VM and the status data value VMD delayed by one clock period. The decoding matrix portion 252 outputs a decoded data value corresponding to the status data values VM and VMD using a decoding matrix (decoding table) shown in FIG. 23. The decoding matrix may be a ROM table or structured as hardware. Such an operation is performed corresponding to clock pulses. Thus, decoded data is generated.

Next, the decoding matrix shown in FIG. 23 will be described. The status transition diagram shown in FIG. 14 represents that a decoded data value corresponds to two successive status data values. For example, when the status data value VM at time point t is "01" and the status data value VMD at time point t−1 one clock period prior is "00", the decoded data value is "1" as shown in FIG. 23.

On the other hand, the mismatch detecting circuit 253 can be structured with for example an exclusive-OR circuit. The status data values VM00, VM11, VM01, and VM10 are supplied to the mismatch detecting circuit 253. The mismatch detecting circuit 253 detects a mismatch of these four status data values and outputs the detected result as a mismatch detection signal NM. Unless all the four status data values match each other, the mismatch detection signal NM is enable or active. According to an embodiment of the present invention, the mismatch detecting circuit 253 is disposed in the merge block 135. However, the mismatch detecting circuit 253 may be disposed in another portion as long as the mismatch detecting circuit 253 can receive all status data values from the SUM 134.

Whenever four status data values are supplied, the mismatch detection signal NM is supplied to a counting means disposed in the controller 2 corresponding to clock pulses. Thus, the number of mismatches of four status data values is counted at intervals of a predetermined period (for example, sector by sector). According to an embodiment of the present invention, the counting means is disposed in the controller 2. However, the counting means may be disposed in another position as long as the counting means can receive the mismatch detection signal NM. With the mismatch detecting circuit 253, the reliability of the decoded data, the quality of the reproduced signal, and so forth are evaluated corresponding to the counted result.

Next, returning to FIG. 16, the structure for performing the Viterbi determination mode will be described. As will be described later, in the Viterbi determination mode, a phase error is detected (extracted) with the timing of a leading edge or a trailing edge of a reproduced RF signal that is output. from an SMU 134. A reproduced signal value z[k] received from the A/D converter 12 is supplied to a shift register 136. The shift register 136 delays the reproduced signal value z[k] and supplies the resultant data to a phase error calculating device (PEC) 137. The delay time is designated corresponding to the operation time of the SMU 134.

A timing generator 138 supplies to the PEC 137 four timing signals for extracting a phase error. Status data is supplied from the SUM 134 to the timing generator 138. As will be described later, the timing generator 138 references the status data and generates four timing signals that represent timings for extracting a phase error. The PEC 137 calculates reproduced signal values at timings represented by the four timing signals and generates a phase error signal PE.

The generated phase error signal PE is converted into analog signal by a D/A converter 139. The analog signal is supplied to a VCO 41 through a loop filter 140. The VCO 141 receives the phase error signal PE as a control signal and generates a read clock signal DCK with a phase corresponding to the phase error signal PE. The read clock signal DCA is supplied to the A/D converter 12, the individual portions of the Viterbi decoder 130, the shift register 136, the PEC 137, the timing generator 138, the D/A converter 139, and so forth.

Next, the phase error detecting operation in the Viterbi determination mode performed in the above-described structure will be described. The timing generator 138 obtains the timings of a leading edge and a trailing edge of a reproduced RF signal.

Figure 24A:
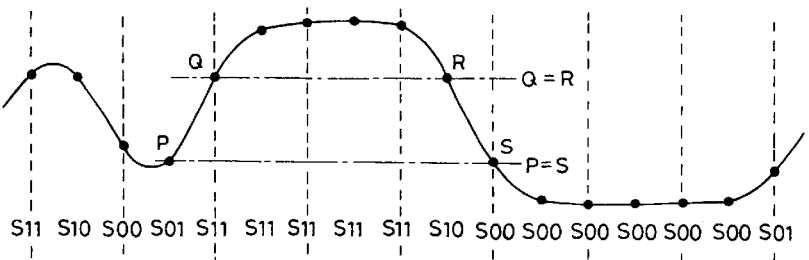
FIGS. 24A, 24B, and 24C are graphs for explaining the relation between status transitions and error detection timings.
Figure 24B:
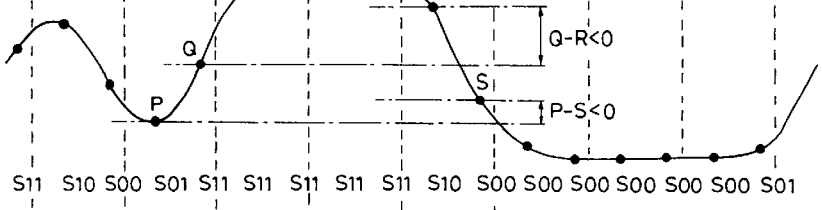
Figure 24C:
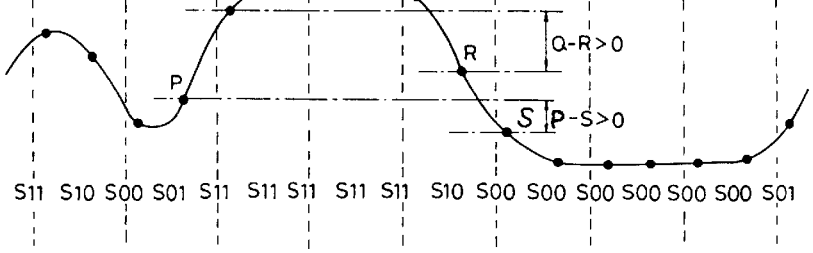

FIGS. 24A, 24B, and 24C show sampling points of the reproduced RF signal supplied to the A/D converter 12 corresponding to the read clock signal DCK. In FIGS. 24A, 24B, and 24C, sampling points are denoted by black points. In addition, statuses selected corresponding to individual sampling points are represented on x axis of each graph. FIG. 24A shows the case that there is no phase error. FIG. 24B shows the case that the phase of the read clock signal DCK advances against the phase of the reproduced RF signal. FIG. 24C shows the case that the phase of the read clock signal DCK delays against the phase of the reproduced RF signal. In FIGS. 24A, 24B, and 24C, dashed lines are drawn every two read clock pulses for easy representation of a phase error.

In FIGS. 24A, 24B, and 24C, P represents a sampling value at a leading edge of a reproduced signal. In other words, since the reproduced signal value P in the status S00 is within an allowable error of noise and "1", a status transition to the status S01 takes place one read clock period later. The sampling value Q of the reproduced signal value in the status S01 is within an allowable error of noise and "3", a status transition to the status S11 takes place one clock period later. Thus, it is clear that the signal level of the reproduced RF signal goes high in the period between the sampling points P and Q.

On the other hand, in FIG. 14, at time point j corresponding to the read clock signal DCK, when a status transition S11→S10 takes place, it is clear that a status transition S10→S00 takes place at the next time point j+1. In this case, the reproduced signal value is within an allowable error of noise and z[j]=3 and z[j+1]=1. Thus, with the status data, it can be determined that the time point j corresponds to a trailing edge of the reproduced RF signal. Next, with reference to FIG. 24, this detecting method will be practically described.

In FIGS. 24A, 24B, and 24C, R represents a sampling value at a trailing edge of the reproduced RF signal. Since the reproduced signal value R in the status S11 is within an allowable error of noise and "3", a status transition S11→S10 takes place one read clock period later. Since the sampling value Q as the reproduced signal value in the status S10 is within an allowable error of noise and "1", a status transition S10→S00 takes place one read clock period later. Thus, it is clear that the signal state of the reproduced RF signal goes low in the period between the sampling point R and the sampling point S. As a result, the relation between sampling points P, Q, R, and S and status transitions is represented as follows.

P: Reproduced signal value at leading edge (status transition S00→S01)

Q: Reproduced signal value one read clock period after leading edge (status transition S11→S10)

R: Reproduced signal value at trailing edge (status transition S01→S11)

S: Reproduced signal value one clock period later after trailing edge (status transition S10→S00)

The timing generator 138 receives status data from the SMU 134 and informs the PEC 137 of timings at which the reproduced signal values P, Q, R, and S are obtained. The PEC 137 samples the reproduced RF signal received through the shift register 136 at these timings and generates the reproduced signal values P, Q, R, and S.

When the phase of the read clock signal DCK precisely matches the phase of the reproduced RF signal as shown in FIG. 24A, referring to FIG. 14, it is clear that the values P and S are within an allowable error of noise and equal to "1" as an identification point value. In addition, referring to FIG. 7, it is clear that the values Q and R are within an allowable error of noise and equal to "3" as an identification point value. Thus, the relations of P=S and Q=R are obtained.

On the other hand, as shown in FIG. 24B, when the phase of the read clock signal DCK advances against the phase of the reproduced RF signal, sampling points are earlier than those in FIG. 24A. Thus, the values P and Q in FIG. 24B are smaller than those in FIG. 24A. In contrast, the values R and S in FIG. 24B are larger than those in FIG. 24A. Consequently, since P<S and Q<R, the relations of P−S<0 and Q−R<0 are satisfied.

On the other hand, when the phase of the read clock signal DCK delays against the phase of the reproduced RF signal, sampling points are later than those in FIG. 24A. Thus, the values P and Q in FIG. 24C are larger than those in FIG. 24A. In contrast, the values R and S in FIG. 24C are smaller than those in FIG. 24A. Consequently, since P>S and Q>R, the relations of P−S>0 and Q−R>0 are satisfied.

Consequently, the value [(P−S)+(Q−S)] can be used as a phase error. In other words, the value of the phase error signal PE is expressed as follows.

$$PE=(P-S)+(Q-R) \quad (40)$$

When the phase of the read clock signal DCK advances against the phase of the reproduced signal (see FIG. 24B), the relation of PE<0 is satisfied. In contrast, when the phase of the read clock signal DCK delays against the phase of the reproduced signal (see FIG. 24C), the relation PE>0 is satisfied. As described above, the value of the phase error signal PE is supplied as a phase error signal to the VCO 141 so as to control the oscillation frequency of the VCO 141.

Figure 25:
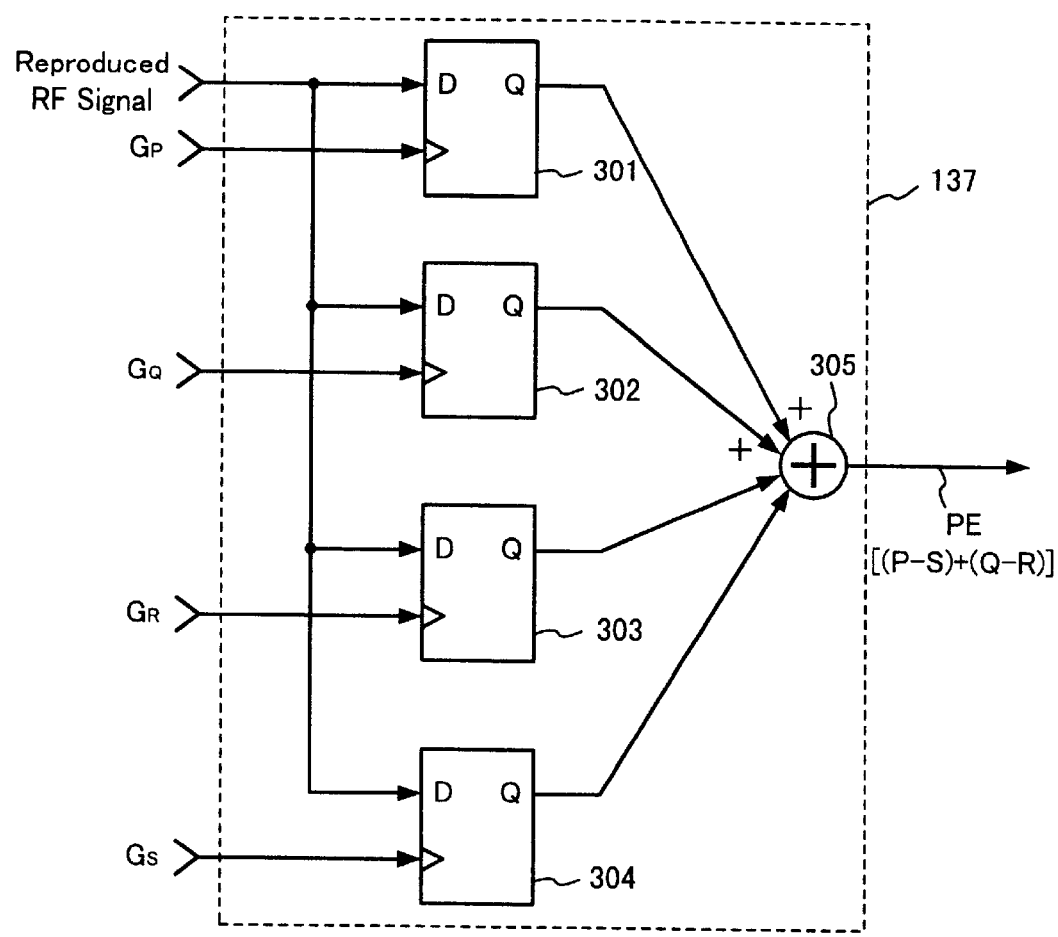
FIG. 25 is a block diagram showing an example of the structure of a PEC that generates a phase error.

Next, the PEC 137 that generates the phase error signal PE will be described. As shown in FIG. 25, the PEC 137 comprises four registers 301, 302, 303, and 304 and a calculating portion 305 that performs a subtraction and an addition corresponding to values received from the registers 301, 302, 303, and 304. Output data of the shift register 136 is supplied to the registers 301, 302, 303, and 304. Namely, a delayed reproduced RF signal is supplied from the shift register 136 to the registers 301, 302, 303, and 304. The timing generator 138 supplies timing signals $G_P$, $G_Q$, $G_R$, and $G_S$ as clock signals to the registers 301, 302, 303, and 304, respectively. The registers 301, 302, 303, and 304 are informed of timings for obtaining reproduced signal values with the timing signals $G_P$, $G_Q$, $G_R$, and $G_S$, respectively. Thus, the registers 301, 302, 303, and 304 properly latch the values P, Q, R, and S, respectively.

With the values P, Q, R, and S, the calculating portion 305 calculates the value of the phase error signal PE corresponding to Formula (40). As described above, the phase error signal PE is supplied to the VCO 141 through the D/A converter 139 and the loop filter 140. The VCO 141 controls the oscillation frequency of the VCO 141 with the phase error signal PE. In addition, the calculating portion 305 always calculates the value of the phase error signal PE while receiving the reproduced RF signal.

If the PLL is locked and thereby no phase error takes place, since the relations of B=C and A=D are satisfied, the phase error signal PE can be obtained corresponding to one of Formulas (41) to (44) as well as Formula (40)

$$PE=B-C \quad (41)$$

$$PE=A-D \quad (42)$$

$$PE=A+B-DC\ level \quad (43)$$

$$PE=C+D-DC\ level \quad (44)$$

where DC level represents a DC level of a reproduced RF signal.

The phase error PE may be an average value of phase error signals obtained by a plurality of formulas or a value obtained by a time division method.

As described above, a phase error position is obtained with a status transition. However, when the phase error position is obtained with status data that is output from the SMU 134, the obtained phase error is delayed until the data is read and processed by the SMU 134. Normally, the SMU 134 of the Viterbi decoder has a long memory length enough to merge metrics. Thus, when the phase error position is used for a phase error signal, the band of the PLL may be insufficient.

Figure 26:
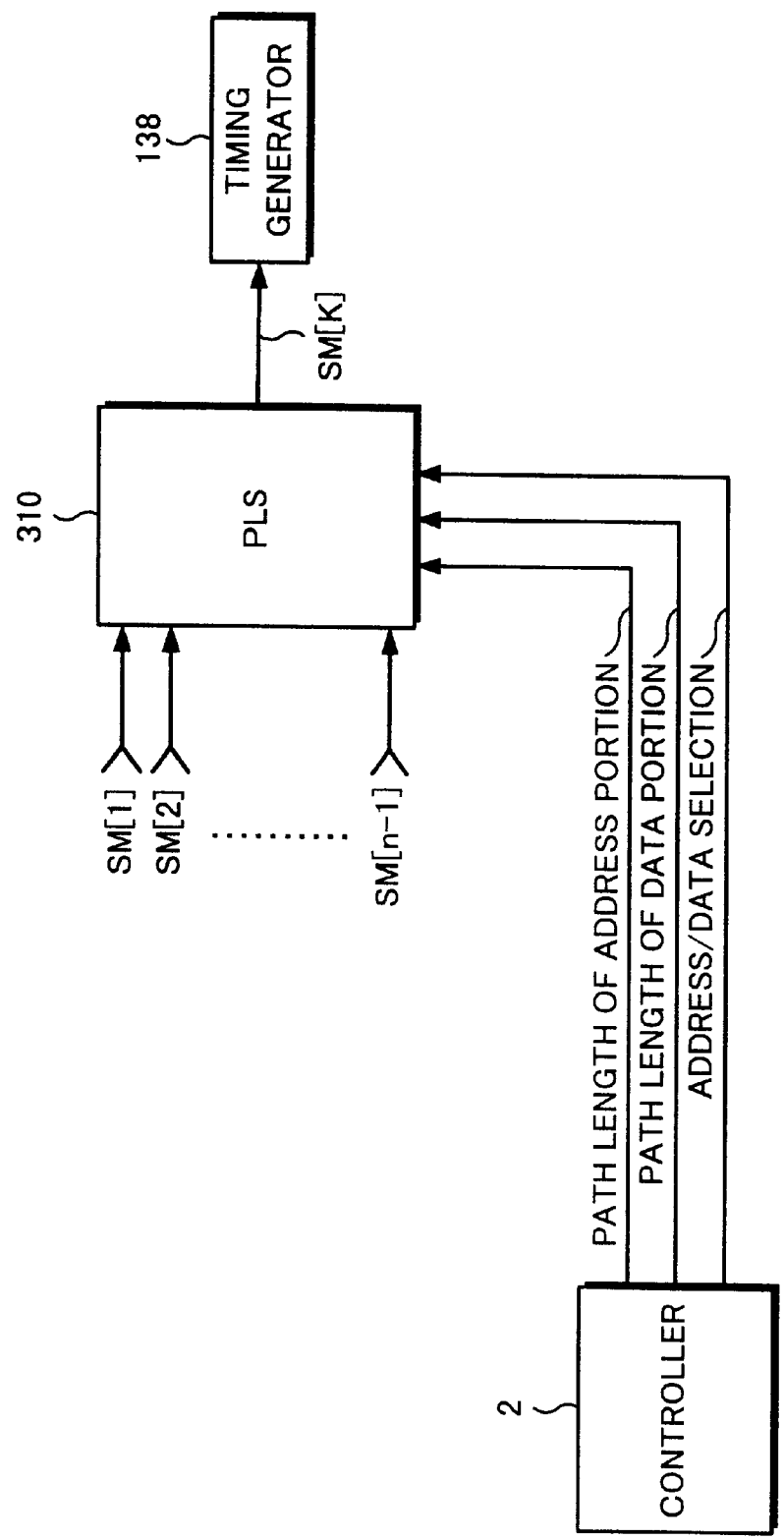
FIG. 26 is a block diagram showing an example of a path length selector.

To solve such a problem, the maximum likelihood status in the middle of stages of the SMU 134 may be detected. With the status transition, a phase error position may be obtained. In other words, (n−1) status data values SMout received from the A type status memory 150 of the SMU 134 are supplied to a path length (memory length) selector 310 shown in FIG. 26. The controller 2 shown in FIG. 2 supplies path length data to the path length selector (PLS) 310. The path length selector (PLS) 310 selects status data SM[k] corresponding to the received path length data and supplies the selected data SM[k] to a timing generator 138. It should be noted that status data values that are output from the other status memories 151, 152, and 153 may be supplied to the path length selector (PLS) 310 shown in FIG. 26. Thus, in the case that a status transition from the status in the (k−1)th stage of the SMU 134 to the k-th stage thereof is selected, when a status with the minimum metric value is selected, even if metrics have not been merged, the probability of which a correct status is selected is very high. With a phase error position (timing) obtained with status data in the middle of stages of the SMU 134, the problem of which the band of the PLL is insufficient can be solved to some extent.

In the case that the detection timing of a phase error is obtained with status data received from the SMU 134, as was described with reference to FIG. 3, when a magneto-optic disc has a header area and a data area (in which data has been magneto-optically recorded), the memory length (path length) for the header area may be different from the memory length for the data area.

The memory length of the SMU 134 depends on the C/N (Carrier/Noise) ratio of the reproduced RF signal and frequency characteristics thereof. In the case of a magneto-optic disc, in the header area that has been embossed, data is electrically read corresponding to intensity of reflected light of a laser beam radiated to pre-pits corresponding to the difference of phases equivalent to the difference of optical paths. In contrast, in the data area, data is electrically read corresponding to the difference of phases of reflected light due to Kerr effect. Since the reproducing method for the header area is different from that for the data area, the difference between the quality of a signal reproduced from the header area is different from that from the data area. Thus, to decode data in the header area with relatively high signal quality, a relatively large memory length is not required for the SMU 134. In contrast, to decode data in the data area, a large memory length is required for the SMU 134.

Thus, when a detection timing of the phase error PE of the PLL is determined with status data of the SMU 134, for the header area, the maximum likelihood data is output from a relatively small memory of the SMU. In contrast, for the data area, the maximum likelihood data is output from a relatively large memory of the SMU. In reality, the controller 2 causes the PLS 310 to designate memory lengths for the header area and the data area. The PLS 130 selects status data values with optimum path lengths for the header area and the data area and uses them depending on whether data is reproduced from the header area or the data area is reproduced.

The embodiment of the present invention is applied to a magneto-optic disc apparatus corresponding to four-value four-status Viterbi decoding method. However, it should be noted that the present invention is applied to magneto-optic disc apparatuses corresponding to other types of Viterbi decoding methods such as three-value four-status Viterbi decoding method and seven-value six-status Viterbi decoding method.

In addition, the present invention can be applied to an information reproducing apparatus corresponding to Viterbi decoding method for decoding data that has been read from data recorded on a record medium. In other words, the present invention can be also applied to rewritable discs (such as phase change type disc PD and CD-E (CD-Erasable)), recordable discs (such as CD-R), and read-only discs (such as CD-ROM).

It should be noted that the present invention is not limited to the above-described embodiment. Instead, without departing from the spirit of the present invention, various changes and modifications are available.

As described above, according to the present invention, in the Viterbi decoding method, status data that represents the maximum likelihood status transition selected corresponding to a calculated result of a reproduced signal is generated. Thus, decoded data is obtained. In addition, with status data, the detection timing of a phase error of the PLL can be obtained. With the detection timing of the phase error, a phase error signal can be generated. With the phase error signal, the PLL can be locked. Thus, an adequate read clock signal can be generated.

In addition, memory lengths for the header area and the data area can be optimally designated. Thus, the band of the PLL for the address portion and the band of the PLL for the data portion can be independently designated.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An information reproducing apparatus for decoding a signal reproduced from a recording medium corresponding to Viterbi decoding method, comprising:

status data generating means, having a plurality of status memories in which said status data is latched, for generating status data that represents the maximun likelihood status transition with a reproduced signal value sampled corresponding to a clock signal;

decoded data outputting means for outputting decoded data with the status data;

detection timing generating means for generating a detection timing of a phase error signal corresponding to information of a leading edge or a trailing edge of a reproduced signal using the status data;

path length switching means for switching a path length of said status memories in which the status data is latched until it is obtained by said detection timing generating means when a plurality of reproduced signals with different signal qualities are input to said detection timing generating means;

phase error signal generating means for calculating the reproduced signal value at the detecting timing so as to generate a phase error signal; and a PLL (Phase Locked Loop) for receiving the phase error signal as a control signal and generating the clock signal.

2. An information reproducing apparatus for decoding a signal reproduced from a recording medium corresponding to Viterbi decoding method, comprising:

status data generating means for generating status data that represents the maximum likelihood status transition with a reproduced signal value sampled corresponding to a clock signal;

decoded data outputting means for outputting decoded data with the status data;

detection timing generating means for generating a detection timing of a phase error signal corresponding to a leading edge or a trailing edge of a reproduced signal using the status data;

phase error signal generating means for calculating the reproduced signal value at the detecting timing so as to generate a phase error signal; and a PLL (Phase Locked Loop) for receiving the phase error signal as a control signal and generating the clock signal, wherein the status data is a sequence of numeric values represented by bits that depend on the type of the Viterbi decoding method.

3. An information reproducing apparatus for decoding a signal reproduced from a recording medium corresponding to Viterbi decoding method, comprising:

status data generating means for generating status data that represents the maximum likelihood status transition with a reproduced signal value sampled corresponding to a clock signal;

decoded data outputting means for outputting decoded data with the status data;

detection timing generating means for generating a detection timing of a phase error signal corresponding to a leading edge or a trailing edge of a reproduced signal using the status data;

phase error signal generating means for calculating the reproduced signal value at the detecting timing so as to generate a phase error signal; and a PLL (Phase Loocked Loop) for receiving the phase error signal as a control signal and generating the clock signal, wherein said phase error signal generating means calculates a plurality of reproduced signal values at a plurality of detection timings corresponding to a predetermined calculation so as to generate the phase error signal.

4. An information reproducing apparatus for decoding a signal reproduced from a recording medium corresponding to Viterbi decoding method, comprising:

status data generating means for generating status data that represents the maximum likehood status transition with a reproduced signal value sampled corresponding to a clock signal;

decoded data outputting means for outputting decoded data with the status data;

detection timing generating means for generating a detection timing of a phase error signal corresponding to a leading edge or a trailing edge of a reproduced signal using the status data;

phase error signal generating means for calculating the reproduced signal value at the detecting timing so as to generate a phase error signal; and a PLL (Phase Locked Loop) for receiving the phase error signal as a control signal and generating the clock signal, wherein said detecting timing generating means obtains the status data from the middle of status memories that store the status data.

5. An information reproducing apparatus for decoding a signal reproduced from a recording medium corresponding to Viterbi decoding method, comprising:

status data generating means for generating status data that represents the maximum likelihood status transition with a reproduced signal value sampled corresponding to a clock signal;

decoded data outputting means for outputting decoded data with the status data;

detection timing generating means for generating a detection timing of a phase error signal corresponding to a leading edge or a trailing edge of a reproduced signal using the status data;

phase error signal generating means for calculating the reproduced signal value at the detecting timing so as to generate a phase error signal; and a PLL (Phase Locked Loop) for receiving the phase error signal as a control signal and generating the clock signal, wherein said status data generating means include plural status memories for storing path metrics of the status data, and wherein said detection timing generating means selects status data corresponding to the maximum likelihood of the latest path metrics stored in the status memories so as to obtain the accurate detection position of the phase error signal.

6. The information reproducing apparatus as set forth in claim 1, wherein the record medium is a rewritable optical disc, and wherein said path length switching means switches the memory length of the status memories with a signal reproduced from an embossed area of the optical disc and a signal reproduced from a rewritable data area thereof.

7. An information reproducing method for decoding a signal reproduced from a recording medium corresponding to Viterbi decoding method, comprising the steps of:

generating status data that represents the maximum likelihood status transition with a reproduced signal value sampled corresponding to a clock signal;

generating decoded data with the status data;

generating a detection timing of a phase error signal corresponding to information of a leading edge or a trailing edge of a reproduced signal using the status data;

switching a path length of a plurality of status memories in which the status data is latched;

calculating the reproduced signal value at the detection timing so as to generate a phase error signal; and supplying the phase error signal as a control signal to a PLL (Phase Locked Loop) that generates the clock signal.

8. An information reproducing apparatus for decoding a signal reproduced from a recording medium corresponding to Viterbi decoding method, comprising:

branch metric calculating means for calculating branch metrics for available statuses at particular time point with a rproduced signal that is input;

path metric updating means for selecting the maximum likelihood path metric in each status with added values of the branch metrics and preceding path metrics, outputting a first selection signal corresponding to the selected result, and outputting a second selection signal with a minimum value of the path metrics;

status data generating means, having a plurality of status memories corresponding to the individual statuses, for updating status data that represents each status with the first selection signal corresponding to a clock signal in each status memory;

status data selecting means for outputting the most adequate status data from the status data stored in the status memories with the second selection signal;

data decoding means for outputting decoded data with the selected status data and a preceding status data;

phase error signal generating means for detecting a phase error of the reproduced signal corresponding to the status data received from said status data generating means; and clock signal generating means for generating the clock signal using the detected phase error.

9. The information reproducing apparatus as set forth in claim 8, further comprising:

timing signal generating means for deciding a timing to detect the phase error of the reproduced signal with status data received form said status data generating means.

* * * * *

UNITED STATES PATENT AND TRADEMARK OFFICE
CERTIFICATE OF CORRECTION

PATENT NO. : 6,317,471 B1
DATED : November 13, 2001
INVENTOR(S) : Junichi Horigome et al.

It is certified that error appears in the above-identified patent and that said Letters Patent is hereby corrected as shown below:

Column 11,
Line 1, after "and", insert -- S100. --; start new paragraph beginning with "In FIG.6…"
Line 49, change "stats" to -- status --.

Column 13,
Line 25, change "block" to -- clock --.

Column 14,
Line 67, change "The" to -- the --.

Column 15,
Line 4, change "pint" to -- point --;
Line 42, change "axz[k]-β." to -- $\alpha xz[k]\text{-}\beta$. --

Column 17,
Line 34, change "311" to -- $\mathbf{31_1}$ --;
Line 35, change "3114" to -- $\mathbf{31_{14}}$ --.

Column 18,
Line 51, change "$\mathbf{31_{11}}$" to -- $\mathbf{31_1}$ --;
Line 57, change "$\mathbf{32_2}$" to -- $\mathbf{32_0}$ --;
Line 62, change "$\mathbf{32_2}$" to -- $\mathbf{32_0}$ --.

Column 19,
Line 59, change "methods" to -- method --.

Column 20,
Line 19, (second occurrence) change "S1" to -- S11 --.

UNITED STATES PATENT AND TRADEMARK OFFICE
CERTIFICATE OF CORRECTION

PATENT NO.     : 6,317,471 B1
DATED          : November 13, 2001
INVENTOR(S)    : Junichi Horigome et al.

It is certified that error appears in the above-identified patent and that said Letters Patent is hereby corrected as shown below:

Column 23,
Line 64, change "$212_1$," to -- $\mathbf{212_1}$, --.

Signed and Sealed this

Ninth Day of July, 2002

*Attest:*

*Attesting Officer*

JAMES E. ROGAN
*Director of the United States Patent and Trademark Office*